(12) United States Patent
Corbett et al.

(10) Patent No.: US 7,375,738 B2
(45) Date of Patent: May 20, 2008

(54) ELECTRONIC SYSTEMS AND METHODS FOR REDUCING LASER BEAM PROCESS DIRECTION POSITION ERRORS

(75) Inventors: William P. Corbett, Lexington, KY (US); Thomas A. Fields, Winchester, KY (US); Allen P. Johnson, Lexington, KY (US); Christopoher D. Jones, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 423 days.

(21) Appl. No.: 10/808,155

(22) Filed: Mar. 24, 2004

(65) Prior Publication Data

US 2005/0212903 A1 Sep. 29, 2005

(51) Int. Cl.
*B41J 2/435* (2006.01)
*B41J 2/47* (2006.01)

(52) U.S. Cl. ........................ 347/234; 347/248

(58) Field of Classification Search ........ 347/115–116, 347/232–238, 246–250; 345/506; 358/1.15
See application file for complete search history.

(56) References Cited

U.S. PATENT DOCUMENTS

| | | | |
|---|---|---|---|
| 3,575,505 A | 4/1971 | Parmigtani | |
| 4,233,612 A | 11/1980 | Hirayama et al. | |
| 4,533,959 A | 8/1985 | Sakurai | |
| 4,602,383 A | 7/1986 | Ogawa et al. | |
| 4,630,098 A | 12/1986 | Fling | |
| 4,932,732 A | 6/1990 | Nakajima | |
| 4,953,230 A | 8/1990 | Kurose | |
| 4,975,626 A | 12/1990 | Yagi et al. | |
| 4,975,788 A | 12/1990 | Yamanishi | |
| 5,061,949 A | 10/1991 | Ogino et al. | |
| 5,233,168 A | 8/1993 | Kulik | |
| 5,272,503 A | 12/1993 | LeSueur et al. | |
| 5,491,540 A | 2/1996 | Hirst | |
| 5,517,328 A | 5/1996 | Wilson | |
| 5,517,587 A | 5/1996 | Baker et al. | |
| 5,585,836 A | 12/1996 | Pham et al. | |
| 5,719,680 A | 2/1998 | Yoshida et al. | |
| 5,754,576 A | 5/1998 | Kusano et al. | |
| 5,764,243 A * | 6/1998 | Baldwin | 345/506 |
| 5,926,837 A | 7/1999 | Watanabe et al. | |
| 5,933,184 A | 8/1999 | Ishigami et al. | |
| 6,075,393 A | 6/2000 | Tomita et al. | |
| 6,118,463 A | 9/2000 | Houki et al. | |
| 6,175,375 B1 | 1/2001 | Able et al. | |

(Continued)

FOREIGN PATENT DOCUMENTS

JP 59226978 A 12/1984

(Continued)

*Primary Examiner*—Hai Pham
(74) *Attorney, Agent, or Firm*—Stevens & Showalter, LLP

(57) ABSTRACT

Systems and methods are provided for electronically adjusting an image to compensate for laser beam process direction position errors in an electrophotographic device. Initially, a bow profile is defined that characterizes the process direction position errors of a laser beam across a scan line. The device subsequently reads an image to be printed from a first memory location, performs pixel shifts on select columns thereof based upon the bow profile, and temporarily stores the adjusted image data to a second location of memory. The adjusted image data is then communicated to a printhead of the device.

38 Claims, 7 Drawing Sheets

U.S. PATENT DOCUMENTS

| | | |
|---|---|---|
| 6,188,801 B1 | 2/2001 | Tsai et al. |
| 6,215,511 B1 | 4/2001 | Asako et al. |
| 6,229,555 B1 | 5/2001 | Hadady et al. |
| 6,342,963 B1 | 1/2002 | Yoshino |
| 6,359,640 B1 | 3/2002 | Ravitz et al. |
| 6,363,228 B1 | 3/2002 | Ream |
| 6,408,013 B1 | 6/2002 | Akagi et al. |
| 6,441,915 B1 * | 8/2002 | Imaizumi et al. ........... 358/1.15 |
| 6,445,404 B1 * | 9/2002 | Kerby et al. ................. 347/237 |
| 6,486,906 B1 | 11/2002 | Foster et al. |
| 6,657,650 B1 | 12/2003 | Omelchenko et al. |
| 6,697,401 B1 | 2/2004 | Schrodinger |
| 6,747,766 B1 | 6/2004 | Kamisuwa et al. |
| 6,819,351 B2 * | 11/2004 | O'Hara et al. ............... 347/237 |
| 7,079,685 B1 | 7/2006 | Hirota et al. |
| 2002/0130792 A1 | 9/2002 | Schaefer |
| 2005/0212902 A1 | 9/2005 | Cook et al. |

FOREIGN PATENT DOCUMENTS

| | | |
|---|---|---|
| JP | 60007656 A | 1/1985 |
| JP | 60222258 A | 11/1985 |
| JP | 01-241444 | 9/1989 |
| JP | 04-317254 | 11/1992 |
| JP | 08-123900 | 5/1996 |
| JP | 9186853 A | 7/1997 |
| JP | 9265511 A | 10/1997 |
| JP | 2001080124 A | 3/2001 |
| JP | 2002094764 A | 3/2002 |

* cited by examiner

ELECTRONIC SYSTEMS AND METHODS FOR REDUCING LASER BEAM PROCESS DIRECTION POSITION ERRORS

CROSS REFERENCE TO RELATED APPLICATIONS

The present application is related to U.S. patent application Ser. No. 10/808,043, filed Mar. 24, 2004, entiled "Memory Device On Optical Scanner And Apparatus And Method For Storing Characterizing Information On The Memory Device"; U.S. patent application Ser. No. 10/808,130, filed Mar. 24, 2004, entitled "Systems For Performing Laser Beam Linearity Correction And Algorithms And Methods For Generating Linearity Correction Tables From Data Stored In An Optical Scanner"; U.S. patent application Ser. No. 10/807,870, filed Mar. 24, 2004, entitled "Algorithms And Methods For Detennining Laser Beam Process Direction Position Errors From Data Stored On A Printhead"; and U.S. patent application Ser. No. 10/757,130, filed Jan, 14, 2004, entitled "Method And Apparatus For Minimizing Visual Artifacts In Images Generated By An Electrophotographic Machine"; each of which is filed currently herewith and hereby incorporated by reference.

BACKGROUND OF THE INVENTION

The present invention relates to an electrophotographic imaging apparatus, and more particularly to systems and methods for electronically reducing laser beam process direction position errors.

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium, such as paper, is given an electrostatic charge opposite that of the toner and is pressed against the drum surface. As the medium passes the drum, the toner is pulled onto the surface of the medium in a pattern corresponding to the latent image written to the drum surface. The medium then passes through a fuser that applies heat and pressure thereto. The heat causes constituents including the thermoplastic components of the toner to flow into the interstices between the fibers of the medium and the fuser pressure promotes settling of the toner constituents in these voids. As the toner is cooled, it solidifies and adheres the image to the medium.

In order to produce an accurate representation of an image to be printed, it is necessary for the laser to write to the drum in a scan direction, which is defined by a straight line that is perpendicular to the direction of movement of the print media relative to the drum (the process direction). However, a number of optical elements including lenses and mirrors are typically required in the apparatus, including the printhead, to direct the laser beam towards the drum. Unavoidable imprecision in the shape and mounting of these optical elements with respect to the laser beam and/or drum can introduce process direction errors in the path of travel of the laser beam when writing across a scan line. It is also possible that a scan line written to the drum is not perpendicular to the movement of the print media due to laser system misalignment and/or media misregistration. Under these conditions, there may be a skew associated with the printed image.

The prior art has attempted to correct for laser beam process direction position errors by incorporating carefully manufactured optics that are precisely aligned. However, the increased precision required by each optical element adds significantly to its cost. Even with precisely manufactured and aligned optics, the degree to which laser beam process direction position errors may be corrected is limited by several factors, including component tolerances. Moreover, distortion of the laser beam optical scan path can occur even in a precisely aligned system due to component aging and/or operational influences such as temperature changes.

SUMMARY OF THE INVENTION

The present invention overcomes the disadvantages of the prior art by providing systems and methods of electronically adjusting an image to compensate for laser beam process direction position errors, e.g., bow and skew, in an electrophotographic device.

According to an embodiment of the present invention, in an electrophotographic device, an image to be printed is read from a first memory area and pixel shifts are performed on select columns thereof, based upon a process direction error profile (bow profile). The bow profile essentially characterizes the process direction position errors of Pels written by a laser of the printhead as the laser beam traverses across its scan path. The adjusted image data is then communicated to a printhead of the device. By pre-warping the image data, the effects of laser beam process direction position errors are compensated.

According to another embodiment of the present invention, a method for electronically altering image data to compensate for laser beam process direction position errors in an electrophotographic device comprises dividing an image to be printed into a plurality of bands. Each band of image data is manipulated by selectively performing process direction shifts according to a bow profile that characterizes process direction position errors of Pels written by a laser beam as it traverses generally in a scan direction, to define adjusted image data. The adjusted image data is stored in a destination buffer and adjusted image data that is shifted out of or beyond the dimensions of the band is captured in an overflow buffer. The adjusted image data is subsequently communicated to a printhead. By pre-warping the image data, the effects of laser beam process direction position errors are compensated.

According to yet another embodiment of the present invention, a system is provided for electronically adjusting image data to compensate for laser beam process direction position errors in an electrophotographic device. A first memory location for storing image data, a second memory location for storing adjusted image data and a bow processor are provided. The bow processor is operatively configured to obtain the image data from the first memory location, apply pixels shifts on select columns of the image data based upon a bow profile that characterizes laser beam process direction position errors of Pels written by the laser beam to define the adjusted image data, and store the adjusted image data in the second memory location. A video processor is operatively configured to derive a laser signal suitable for processing by a printhead based upon the adjusted image data from the second memory location. By pre-warping the image data, the effects of laser beam process direction position errors are compensated

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The Electrophotographic Image Forming Apparatus

Figure 1:
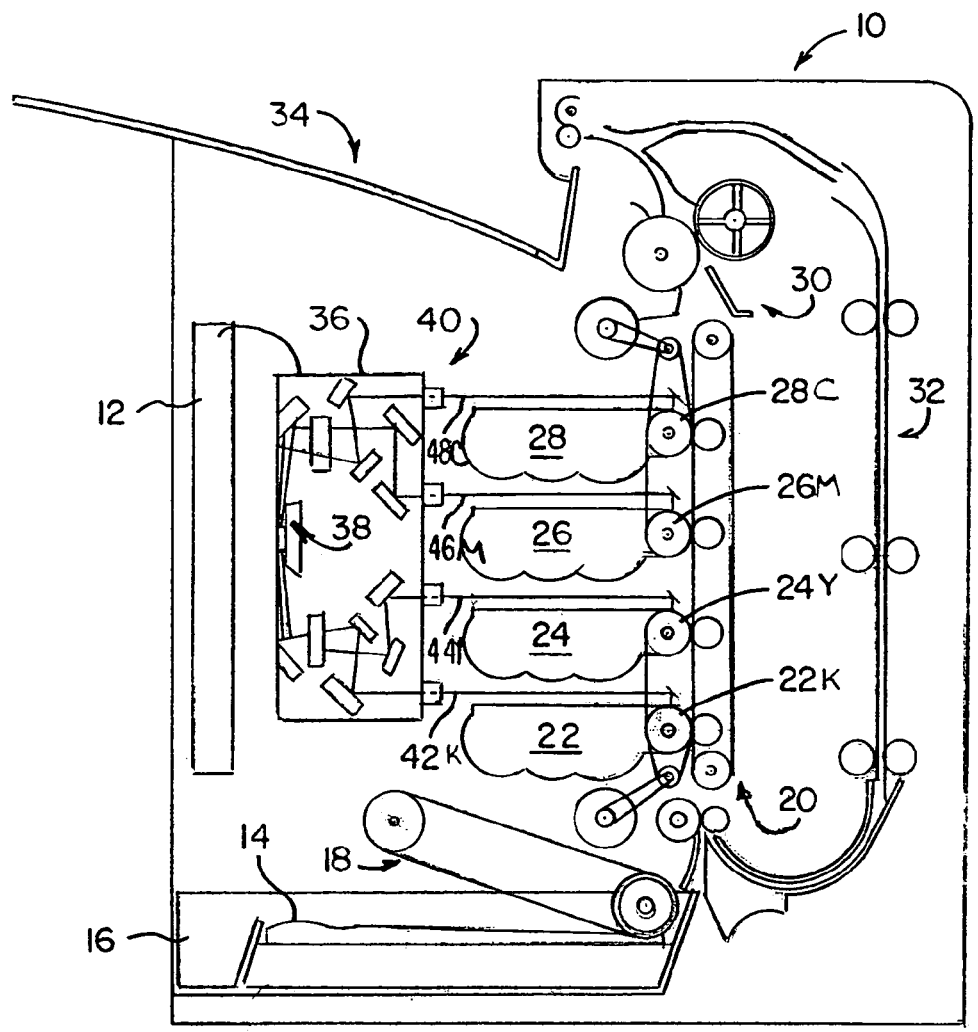
FIG. 1 is a side, schematic view of an exemplary electrophotographic imaging apparatus according to an embodiment of the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging. The controller 12 further performs the electronic correction of process direction position errors according to the various embodiments of the present invention set out herein. For color operation, the image to be printed is de-constructed into four bitmap images corresponding to the cyan, yellow, magenta and black (CYMK) image planes either by the external device, or by the controller 12. The controller 12 then initiates an imaging operation whereby a top sheet 14 of a stack of media is picked up from a media tray 16 by a pick mechanism 18 and is delivered to a media transport belt 20.

The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to the black image plane. The image forming station 24 includes a photoconductive drum 24Y that delivers yellow toner to the sheet 14 in a pattern corresponding to the yellow image plane. The image forming station 26 includes a photoconductive drum 26M that delivers magenta toner to the sheet 14 in a pattern corresponding to the magenta image plane. Correspondingly, the image forming station 28 includes a photoconductive drum 28C that delivers cyan toner to the sheet 14 in a pattern corresponding to the cyan image plane. The controller 12 regulates the speed of the media transport belt 20, media pick timing and the timing of the image forming stations 22, 24, 26, 28 to effect proper registration and alignment of the CYMK image planes to the sheet 14.

The media transport belt 20 then carries the sheet 14 with the four color images superposed thereon to a fuser assembly 30, which applies heat and pressure to the sheet 14 so as to promote adhesion of the toner thereto. Upon exiting the fuser assembly 30, the sheet 14 is either fed into a duplexing path 32 for printing on a second surface thereof, or the sheet 14 is ejected from the apparatus 10 to the output tray 34.

To effect the imaging operation, the controller 12 manipulates and converts the data defining each of the CYMK image planes into a corresponding laser pulse video signal. Each video signal is then communicated to a printhead 36, which includes generally, four lasers (not shown), a single rotating polygonal mirror 38, a pre-scan optical system and a post scan optical system. The optics (pre scan and post scan) are referred to generally herein as the optical system 40. Each laser generates a corresponding laser beam that is modulated according to an associated one of the video signals from the controller 12. In particular, a first laser emits a laser beam 42K that is modulated according to a video signal corresponding to the black image plane. A second laser emits a laser beam 44Y that is modulated according to a video signal corresponding to the yellow image plane. A third laser emits a laser beam 46M that is modulated according to a video signal corresponding to the magenta image plane. Similarly, a fourth laser emits a laser beam 48C that is modulated according to a video signal corresponding to the cyan image plane.

Each laser beam 42K, 44Y, 46M, 48C reflects off the rotating polygonal mirror 38 and is directed towards a corresponding one of the photoconductive drums 22K, 24Y, 26M and 28C by select lenses and mirrors in the optical system 40. The rotation of the polygonal mirror 38 and positioning of the corresponding optics 40 causes each laser beam 42K, 44Y, 46M, 48C to sweep generally, in a scan direction, which is perpendicular to the plane of FIG. 1, across its corresponding photoconductive drum 22K, 24Y, 26M and 28C so as to form an image thereon.

Figure 2:
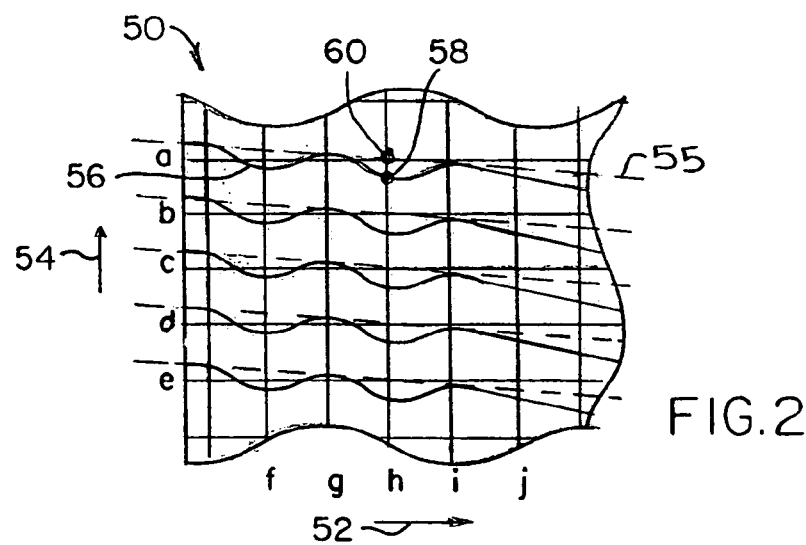
FIG. 2 is a schematic illustration of an exemplary, ideal scan path overlaid by a non-ideal scan path.

Referring to FIG. 2, an imaginary grid 50 has been laid over a section of a photoconductive drum for purposes of illustrating exemplary process direction position errors of a laser beam associated with a given image plane. The grid 50 includes a plurality of rows a, b, c, d, e and a plurality of columns f, g, h, i, j. Each row a, b, c, d, e extends in a scan direction 52, which traverses across the width of the drum. Correspondingly, each column f, g, h, i, j extends in a process direction 54, which is perpendicular to the scan direction 52. Under ideal circumstances, the process direction 54 is also perpendicular to a leading edge (top edge) of a sheet 14 that is to receive a corresponding toner image, and the scan direction 52 is perpendicular to the process direction 54, i.e., traverses across the width of the sheet 14 perpendicular to a side edge thereof.

Referring briefly back to FIG. 1, it can be seen that the four lasers in the printhead 36 share a common rotating polygonal mirror 38 and optical system 40. Due to the unavoidable imprecision in the shape and mounting of the polygonal mirror 38 and optical system 40 with respect to each laser beam 42K, 44Y, 46M, 48C, process direction errors are introduced into the image output. For example, "bow" may occur when the center of a laser beam does not scan along the optical axis of the lens. The farther the center ray of a beam is from the optical axis of the lens, the more the curvature of the bow. Further, because each laser beam 42K, 44Y, 46M, 48C travels through the optics 40 along a unique path, it is likely that the laser beam process direction position errors will be different for each beam 42K, 44Y, 46M, 48C.

Referring back to FIG. 2, it is possible that a written line of print elements (also referred to herein as a pixels, image data bits, or Pels) on the sheet 14, is not perpendicular to the movement of the sheet 14 due to laser system misalignment and/or media misregistration. Under these conditions, there may be a skew associated with a given image plane, as schematically illustrated by the skew line 55. Also, due to process direction position errors such as those discussed above, the scan lines for a given image plane may be curvilinear, as graphically illustrated by the repeating, non-ideal scan lines 56 laid over the grid 50 and superimposed over the skew lines 55. The deviations of the non-ideal scan lines 56 from the ideal grid 50 indicate a measure of the process direction errors for those scan lines. Again, for a color device, each image plane may exhibit a unique degree of skew and/or misalignment, and the scan lines associated with each image plane may exhibit different process direction position errors. For sake of simplifying the discussion herein, bow, skew and other process direction errors will be referred to cumulatively as "printhead bow" or laser beam process direction errors.

As illustrated in FIG. 2, a non-corrected Pel 58, which is intended for intersection a, h is written below the intersection a, h due to the process direction error of the corresponding laser beam. Therefore, the controller 12 electronically pre-warps each image plane in the process direction prior to writing the image data to the corresponding photoconductive drum 22K, 24Y, 26M, 28C such that the effects of printhead bow for each corresponding laser beam path is compensated. This is schematically illustrated by the corrected Pel 60, which is written close to the ideal location a, h.

Notably, laser beam bow is generally consistent for each scan line written by a given laser beam. Thus the bow inherent in each laser beam scan path can be characterized by a "bow profile" that describes an approximation of the process direction position errors of written Pels as the laser beam traverses across its scan path. Thus, in the illustrated embodiment, the controller 12 pre-warps each image plane, i.e., distorts the bitmap image for each image plane to compensate for the process direction position errors inherent in the laser beam scan path by shifting select columns or groupings of image data in each bitmap image according to a predetermined bow profile.

General System Overview

Figure 3:
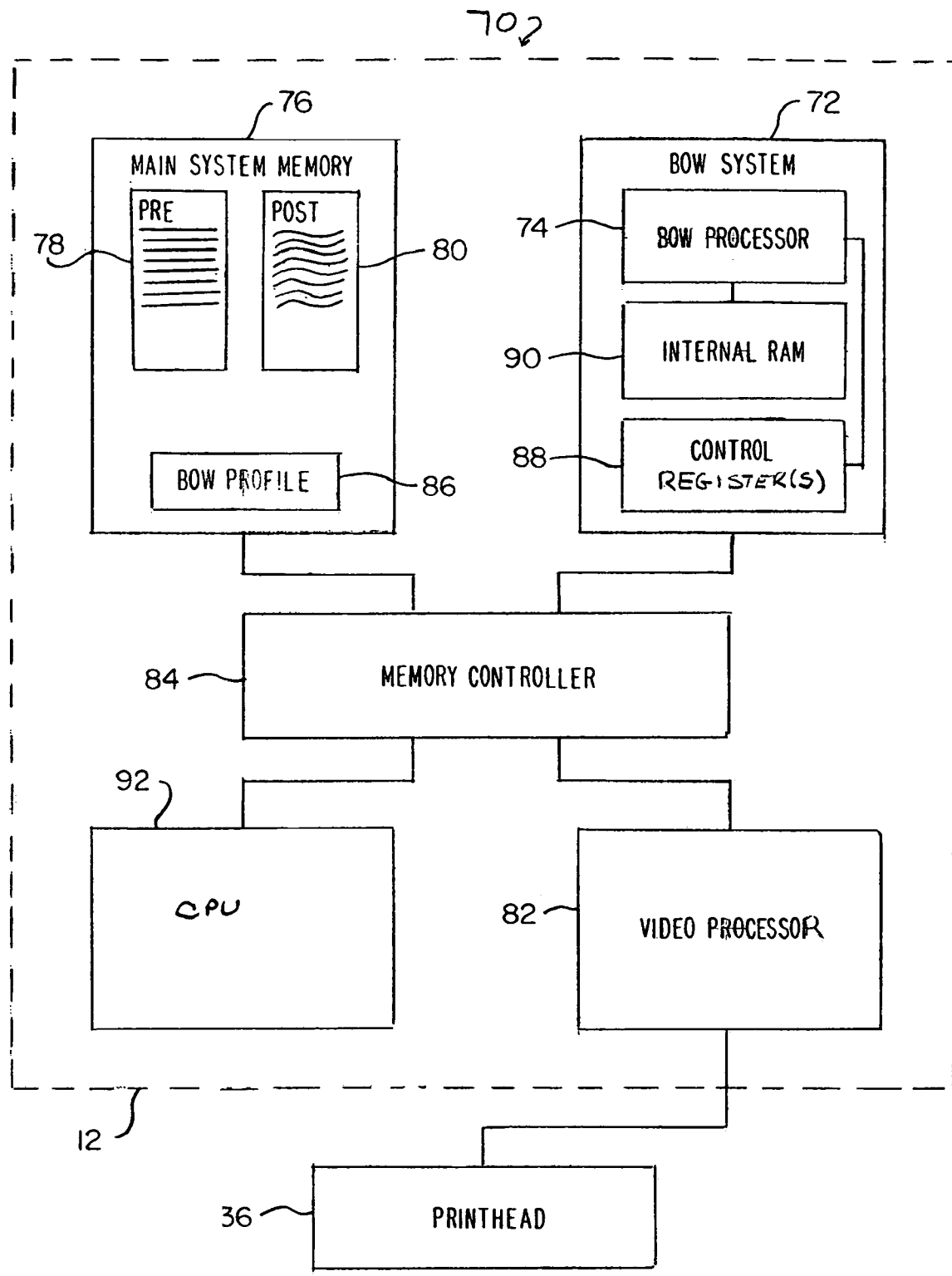
FIG. 3 is a block diagram of a system for correcting laser beam process direction position errors according to an embodiment of the present invention.

Referring to FIG. 3, a block diagram illustrates a system 70 for electronically reducing laser beam process direction errors, i.e. printhead bow and skew. The system 70 may be implemented for example, as one or more components of the system controller 12 illustrated in FIG. 1. The system 70 includes generally, a bow system 72 having a bow processor 74, and a main system memory 76. The bow processor 74 applies process direction pixel shifts to select columns of original, pre-adjusted image data 78 in the system memory 76 to generate adjusted image data 80, which is also stored in the main system memory 76. The pre-adjusted image data 78 comprises ideal data, which, if provided uncorrected to an ideal printhead that exhibits no laser beam process direction error, would result in an image with substantially no bow or skew. However, as described above with reference to FIG. 2, the laser beam scan path may be non-ideal in practice, and as such, a printed representation of the original image data 78 may appear to have bow, and possibly skew thereto. Accordingly, the adjusted image data 80 (in lieu of the pre-adjusted image data 78) is communicated to a video processor 82, which transforms the adjusted image data 80 into a signal suitable for processing by the printhead 36. Basically, the adjusted image data 80 is pre-warped in a manner that is generally opposite of the process direction errors of Pels written by a corresponding laser beam 42K, 44Y, 46M, 48C.

An entire image, e.g., a page of the original image data 78 need not physically reside in the main system memory 76 at any given time. Correspondingly, the entire bow-corrected image need not physically reside in the main system memory 76 at any given time. That is, the bow processor 74 may optionally perform process direction position adjustments on sections of the original image data 78 until the entire image has been bow adjusted. For example, while it may be convenient to perform process direction position adjustments on the entire image prior to initiating a printing operation, such may cause an unacceptably long delay between the time a printed image is requested, and when the apparatus can deliver the printed image. Such delays are compounded in color devices where four image planes (CYMK) must be processed to form a single, color image. Under such an arrangement, the bow processor 74 may operate on sections of the original image data 78 while the printhead 36 is printing previously adjusted sections of the image data. This real-time operation is referred to generally herein as processing "on the fly".

Also, those sections of the original image data 78 that have been processed by the bow processor 74 and communicated to the printhead 36 need not be preserved in the main system memory 76. Accordingly, the main system memory 76 may temporarily store any combination of original image data 78 and adjusted image data 80 at a given time. This allows the system 70 to use and recover its memory in a processor and computational efficient manner. As shown in FIG. 3, the bow processor 74 selectively accesses the main system memory 76 using a memory controller 84. The memory controller 84 allows the bow processor 74 to implement efficient memory access schemes such as direct memory access (DMA) to speed communications between the bow processor 74 and the main system memory 76. For example, the memory management controller 84 may operate as a bios layer. However, other appropriate communication means may alternatively be implemented.

The bow processor 74 receives instructions for applying process direction pixel shifts to the image data 78 from a corresponding instructions list 86 that includes a bow profile (also referred to herein as a process direction position error profile) that characterizes the process direction errors of Pels written by a corresponding laser beam. Accordingly, the bow profile provides a physical description of how to warp the image data. For a mono printer, a single profile may be provided and for a color printer, a profile may be provided for each color plane. The bow profile may be characterized in any manner that allows the bow processor 74 to adjust the corresponding original image data 78 to compensate for laser beam process direction position errors within a degree of precision desired. Thus the bow profile need not correspond to the exact laser beam process direction position errors actually exhibited by the corresponding laser beam 42K, 44Y, 46M, 48C if an approximation thereof results in the desired level of precision required to perform the corrections described herein.

The bow profile for each laser beam scan path may be determined based upon a number of parameters such as manufacturing printhead characterization data stored on the printhead, manufacturing media feed data stored on the transport belt, and machine registration/alignment data stored in the machine during calibration operations. The bow profile may further consider operational conditions such as process error drift determined using run time measurements including scan timings, which may be measured or derived from data measured using thermal, end of scan timing, margin alignment and other detectors. Such operational conditions thus can be used to take into consideration, machine temperature, component age, etc. when deriving the bow profile.

For example, each bow profile may be derived empirically from one or more experiments that measure process direction position errors of a particular laser beam. Such a derivation preferably includes variables that account for dynamic errors, e.g., temperature induced optical errors and age based degrading of the printhead components. Such would allow the instructions list 86 to be periodically updated so that the corrections applied therefrom more accurately reflect the process direction errors in an associated laser beam path. For example, a bow profile may be synthesized for each of four lasers in a color laser printer, at least in part, from data read from nonvolatile memory source(s), such as a memory device on the printhead. Such data may be obtained from a test apparatus during manufacturing that measures process direction position errors at a series of discrete test points. This approach is described in U.S. patent application Ser. No. 10/808,043, filed Mar. 24, 2004, entitled "Memory Device On Optical Scanner And Apparatus And Method For Storing Characterizing Information On The Memory Device", which is already incorporated by reference herein. An exemplary manner in which the bow profile for each laser beam scan path may be computed, such us by software executed by a microprocessor 92, from the above-mentioned test points is described in U.S.patent application Ser. No. 10/807,870, filed Mar. 24, 2004, entitled "Algorithms And Methods For Determining Laser Beam Process Direction Position Errors From Data Stored On A Printhead", which is also already incorporated by reference herein.

The bow processor 74 may obtain inputs such as control instructions via one or more bow control registers 88. Several exemplary instructions are set out in greater detail below. The bow processor 74 may also optionally take advantage of localized memory 90, such as an internal random access memory (RAM) to temporarily store processing data during image warping (pixel shifting) operations. The controller 12 also includes the microprocessor 92 for handling tasks such as interfacing with a computer or other connected device (not shown) for communication therewith, performing printer initialization processes and handling other printer related tasks such as initializing and creating the bow profile 86, initializing the bow control registers 88 with appropriate instructions, and initializing the video processor 82 as will be described in greater detail herein.

The Bitmap Image/Memory Organization

Figure 4:
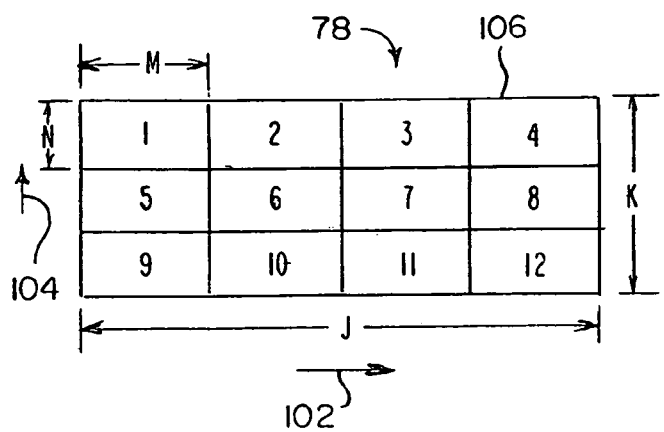
FIG. 4 is a schematic representation of an exemplary image that has been segmented into tiles according to an embodiment of the present invention.

It may be advantageous in certain situations, to logically decompose an image to be printed into smaller portions that are more manageable for processing. Referring to FIG. 4, the bitmapped image data 78, e.g., one of the CYMK image planes of a color image, is schematically illustrated as a J×K matrix of pixels or Pels. There are J pixels in a scan direction 102, and K pixels in a process direction 104. The image data 78 is divided into a plurality of M×N tiles 106. Each tile 106 comprises M pixels in the scan direction 102 where M<J, and N pixels in the process direction 104 where N<K. The size of the image data 78 will be determined by the image dimensions and desired resolution of the printed output. However, the size of each tile 106 can be arbitrarily set.

Figure 5:
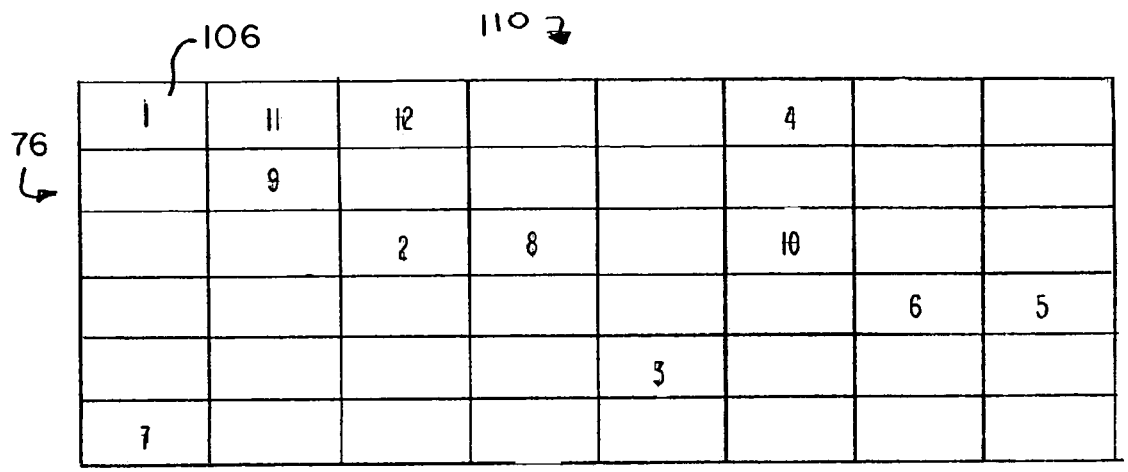
FIG. 5 is a schematic representation of an exemplary system memory for an electrophotographic imaging apparatus according to an embodiment of the present invention.

The organization of image data into tiles 106 allows for the utilization of various optimization schemes to effect the temporary storage of image data. Referring to FIG. 5, a segment 110 of a system memory 76 is used to store the image data 78 of FIG. 4. As can be seen, the tiles 106 that comprise the image need not be stored as in contiguous sections of the system memory 76. Rather, the tiles 106 may be scattered throughout the memory 76. The location of each tile 106 in the main system memory 76 may be stored as a pointer in a lookup table (not shown), which is stored in the system memory 76, a queue or other location and allows random access to the tiles 106.

Figure 6:
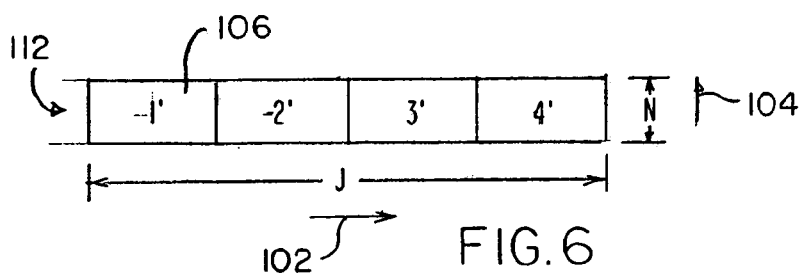
FIG. 6 is a schematic representation of an exemplary image band comprising a plurality of adjacent tiles according to an embodiment of the present invention.

Referring to FIG. 6, it may be helpful for certain processing tasks to further organize the tiles into bands 112. A band 112 comprises a plurality of tiles, the number of which can be arbitrarily set. As illustrated, a band 112 represents an entire row of image data in the scan direction 102 and one tile 106 in the process direction 104. That is, the band 112 is J pixels in the scan direction 102 (the length of the image 100), and N pixels in the process direction 104 (the height of a tile 106). The organization of the image data 78 into bands need not require a physical rearrangement of tiles 106 in the memory segment 110. Rather, bands 112 may be logically organized using pointers or lookup tables.

Figure 7:
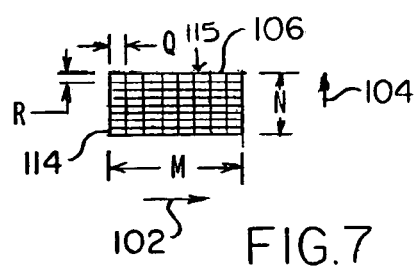
FIG. 7 is a schematic representation of an exemplary tile, which is organized in to a plurality of tile segments.

Referring to FIG. 7, it may be beneficial to logically consider each tile 106 as being composed of a plurality of smaller, more manageable sections referred to herein as tile sections 114. As illustrated, each tile section 114 is Q pixels in the scan direction 102 where Q<M, and R pixels in the process direction 104 where R<N. Q and R are again, arbitrary numbers that can be selected according to the needs of a specific application. For example, the bow processor 74 may have a limited amount of space in its localized memory 90 for performing process direction pixel shifts. Accordingly, the dimensions of each tile section Q, R may be selected to facilitate effective processing within the limitations of the localized memory 90. Another useful organization is referred to herein as a vertical strip 115. A vertical strip 115 is Q pixels in the scan direction 102 and N pixels (an entire tile) in the process direction 104. Thus, a vertical strip 115 can be conceptualized as a plurality of columns one tile section wide, i.e., a stack of tile sections one tile high. Of course, other logical and physical organizations of the image data are possible and within the spirit and scope of the present invention.

Electronic System for Reducing Laser Beam Process Direction Position Errors

Figure 8:
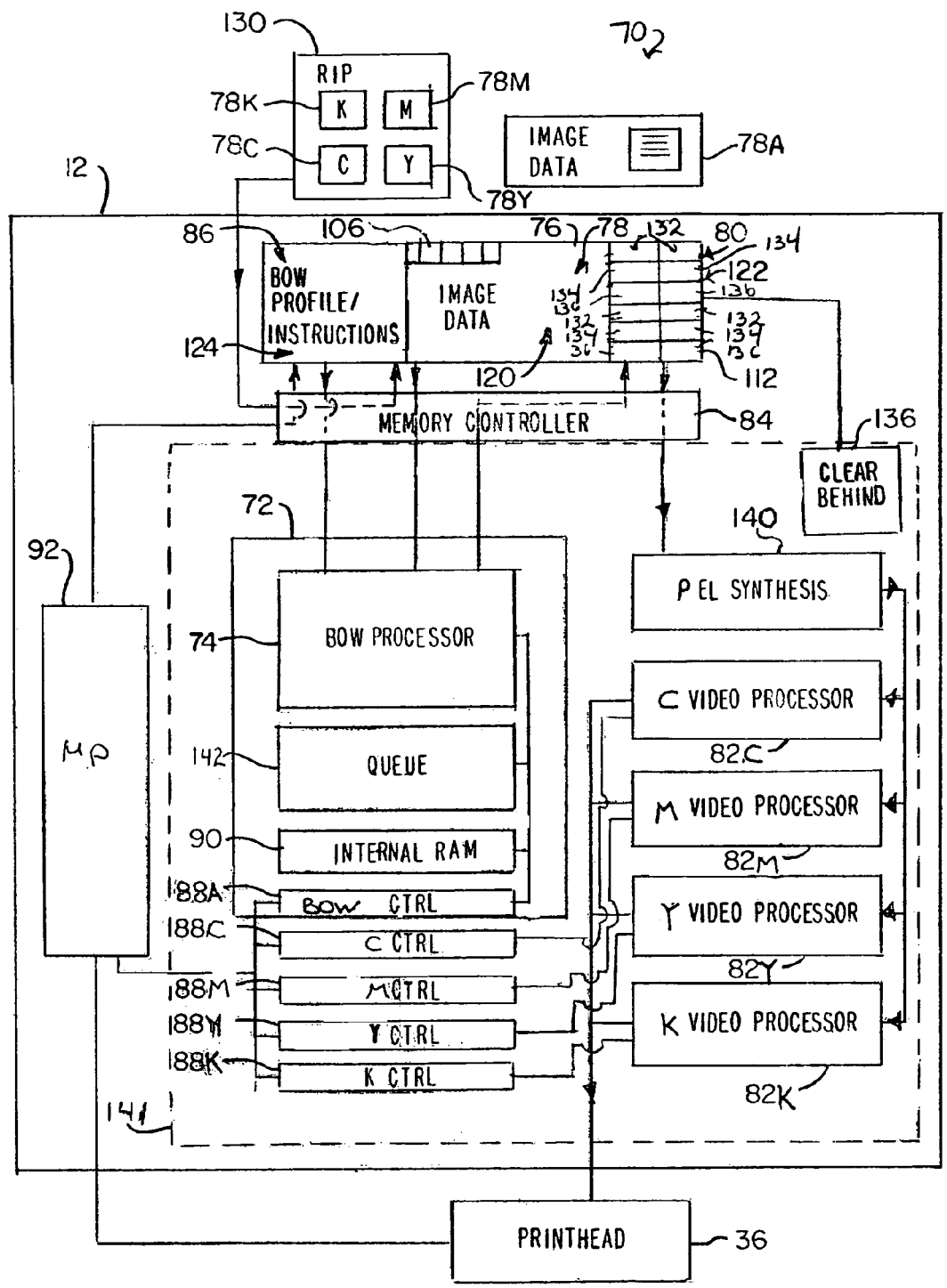
FIG. 8 is a block diagram of a system for correcting laser beam process direction position errors according to an embodiment of the present invention.

Referring to FIG. 8, the system 70 for electronically reducing laser beam process direction position errors in an electrophotography device is illustrated in more explicit detail, and includes additional features making it suitable for processing multiple color image planes such as found in the color laser printer described with reference to FIG. 1. The main system memory 76 is logically divided into a first area 120 for temporarily storing the original, pre-adjusted image data 78 (noted above), a second area 122 for temporarily storing the adjusted image data 80 (noted above), and optionally, a third area 124 that is used to store operational information such as the instructions list 86 as will be explained in greater detail herein. Also provided are bow control registers 88A, cyan image plane video control registers 88C, magenta image plane video control registers 88M, yellow image plane video control registers 88Y and black image plane video control registers 88K. Correspondingly, the video processor 82 (shown in FIG. 3) is replaced by a video processor for each color plane, including a cyan image plane video processor 82C, a magenta image plane video processor 82M, a yellow image plane video processor 82Y and a black image plane video processor 82K.

At initialization, software executed by the microprocessor 92 reserves the second area 122 of system memory 76 for temporarily storing image data that has been bow/skew adjusted by the bow processor 74. Depending upon the particular implementation of the system 70, it may be convenient for the software to also pre-clear, i.e., zero out the second area 122. Software also performs preliminary calculations required for proper operation of the imaging device. For example, software executed by the microprocessor 92 may generate a bow profile or a bow instructions list 86 for each of the CYMK image planes as noted above. The microprocessor 92 loads the bow control registers 88A with information for performing bowing operations. The microprocessor 92 is further responsible for loading each of the color image plane control registers 88C, 88M, 88Y, 88k with the appropriate controls for controlling their corresponding video processors 82C, 82M, 82Y, 82K.

A unique bow profile, hence a unique list of bow instructions, may be required for each of the four color image planes. Moreover, a relatively large amount of data may be required to characterize a specific bow profile/bow instructions list depending upon factors such as the desired output resolution of the printed image and the desired precision in the reduction of process direction position errors. Accordingly, the computed bow instructions may be stored in the third area 124 of the system memory 76. Under such an arrangement, software executed by the microprocessor 92 loads a select one of the bow control registers 88A with a pointer to the third area 124 of the main system memory 76 where a corresponding bow instruction list 86 resides for a given color image plane to be processed. The bow processor 74 performs pixel adjustments by processing column shift commands embedded in the instructions lists 86 stored in the third area 124. From the column shift commands, the bow processor 74 can determine the column or group of columns to be processed for each color plane, the number of rows to jump (shift) for that column (or group of columns), and the direction of any jump.

In operation, a Raster Image Processor (RIP) 130, which is communicably coupled to the controller 12, receives data for an image to be printed from an image data source 78A, such as a connected computer, etc. The data is sent from the source 78A to the RIP 130 using any suitable data format, e.g., postscript or printer control language (PCL). The RIP 130 then converts the data into four bitmaps 78C, 78Y, 78M, 78K corresponding to the four color image planes (CYMK). It is also contemplated that the controller 12 may alternatively perform the functions of the RIP 130. Each bitmap 78C, 78Y, 78M, 78K is broken down into a plurality of tiles 106, as described with reference to FIG. 4, which are stored in the first area 120 of the main system memory 76. The bitmap tiles 106 are retrieved from the first area 120 of the system memory 76 by color image plane, and are processed by the bow processor 74. The bow processor 74 performs process direction pixel shifts on one or more columns of image data for each color image plane according to the corresponding bow instructions 86 in the third area 124 of the main system memory 76 to produce bow adjusted image data.

To effect an efficient bow adjusting operation, the system 70 logically organizes the bow adjusted image data for each image plane into bands 112, as described with reference to FIG. 6, and temporarily stores the bands in the second area 122 according to their associated CYMK image plane. The bow adjusted image data in the second area 122 is subsequently communicated to a corresponding one of the cyan, magenta, yellow and black image plane video processors 82C, 82M, 82Y, 82K, which create a video signal therefrom. These video signals are communicated to the printhead 36 for imaging. The bow processor 74 thus defines a step in the "pipeline" that the image data 78C, 78M, 78Y, 78K must move through prior to being converted to a corresponding laser beam video signal.

The bow processor 74 processes an entire band 112 of image data corresponding to a given image plane before starting the next band. During bowing operations, however, it is possible for data to "overflow" due to the operation of pixel shifting beyond the boundaries of the band 112. As such, the second area 122 is logically organized into four destination buffers 132 and four overflow buffers 134, one destination buffer 132 and one overflow buffer 134 reserved for the processing of a band of image data for each of the color (CYMK) image planes. The destination and overflow buffers 132, 134 are each the size of a band 112. Basically, the bow adjusted image data of a given color image plane is temporarily stored in a corresponding one of the destination buffers 132. The overflow buffer 134 corresponding to the destination buffer 132 for which a bowing operation is being performed, catches image data that overflows that destination buffer 132 as a result of performing pixel shifts beyond the boundary conditions imposed by the size of a band 112. Other logical organizations may alternatively be used, so long as image data is not lost due to overflow of pixel shifts. However, the destination and overflow buffers 132, 134 are useful, especially where processing occurs "on the fly"

because each of the CYMK image planes can be processed in manageable sections (i.e., bands 112) that afford computational efficiency. At the end of the bow operation, either the destination buffer 132 (Simplex mode) or the corresponding overflow buffer 134 (Duplex mode) is ready to be communicated to the corresponding one of the cyan, magenta, yellow and black image plane video processors 82C, 82M, 82Y, 82K, e.g., via a DMA transaction. That is, once a band 112 has been bowed, the microprocessor 92 informs the corresponding one of the cyan, magenta, yellow or black image plane video processors 82C, 82M, 82Y, 82K that the band is available for processing, such as by setting a bit and/or updating a corresponding one of the image plane video control registers 88C, 88M, 88Y, 88K with the address of the newly available band 112. In response thereto, the corresponding one of the cyan, magenta, yellow or black image plane video processors 82C, 82M, 82Y, 82K accesses the bowed band of image data from the second memory area 122.

The localized memory 90 of the bow system 72 is preferably large enough to temporarily store image data therein while being bow adjusted by the bow processor 74, e.g., large enough to store at least one tile section 114. Under such an arrangement, the bow processor 74 operates on the color image planes one band 112 at a time. Moreover, each band 112 is processed one tile section 114 at a time. It may be advantageous however, to select the tile sections 114 to be processed from a given band 112 in an ordered manner. For example, the tile sections 114 may be processed by working across the band 112 a row of tile sections 114 at a time. The processing of rows of tile sections 114 may occur "top-down", such as for simplex printing, or "bottom-up", such as for duplex printing as will be explained in greater detail herein.

In order to perform the appropriate bowing operations, the bow processor 74 is configured by software via the bow control registers 88A with a number of inputs. For example, the bow control registers 88A may be used to provide the addresses in the second area 122 of the system memory 76 where the corresponding destination and overflow buffers 132, 134 are located for the current operation. The bow control registers 88A may also include pointers to bow profile information, tile address information in the first area 120 of the main system memory 76, and may optionally include process enhancing information, such as additional data pointers or print mode information. For example, a device such as that described with reference to FIG. 1 may support simplex and duplex modes of printing. Accordingly, the system may include instructions that direct the bow processor 74 to process the bands from "top to bottom" (simplex) or "bottom to top" (duplex).

Figure 9:
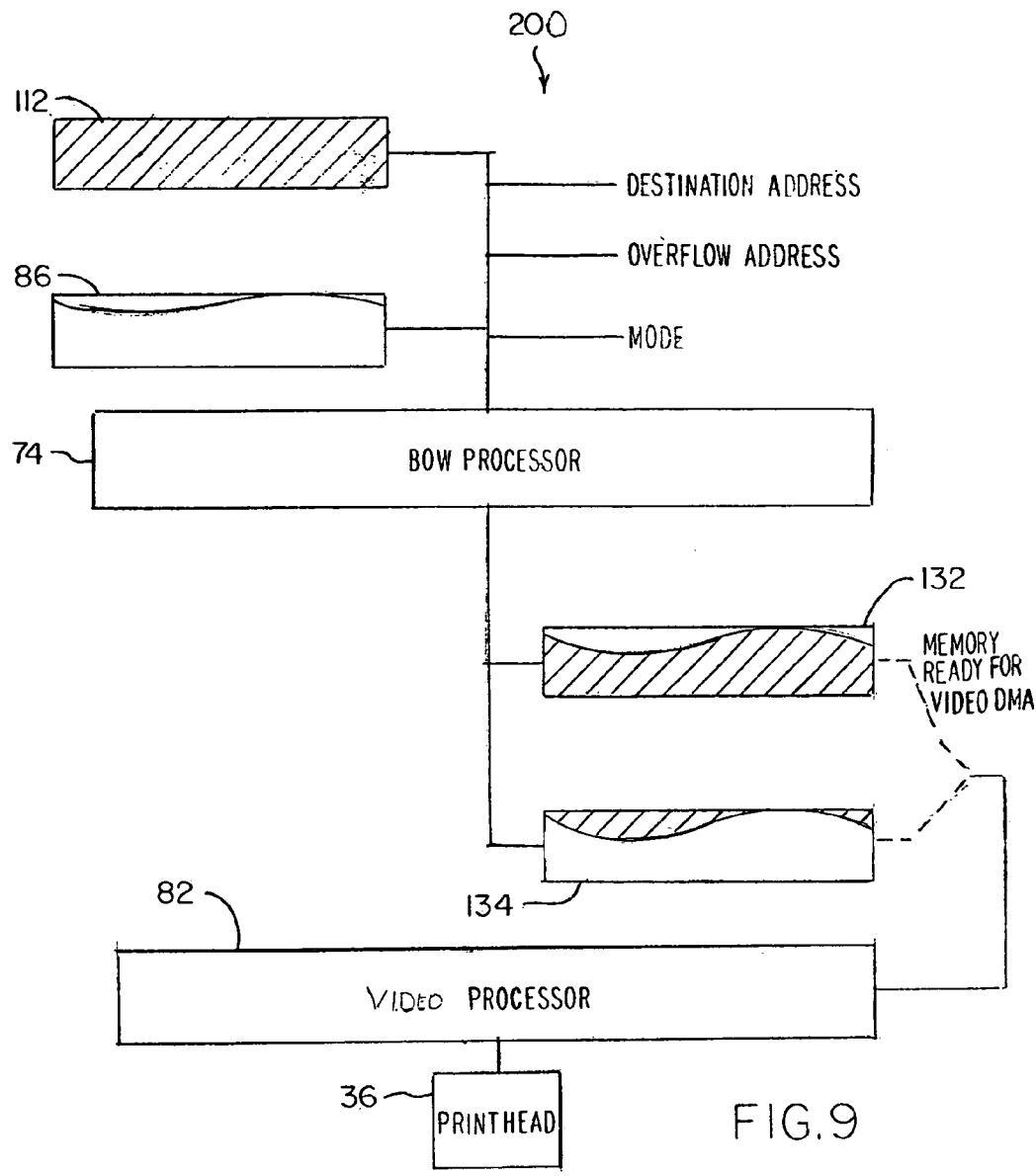
FIG. 9 is a block diagram of a system for correcting laser beam process direction position errors schematically illustrating the application of a bow profile to image, according to an embodiment of the present invention.

Referring to FIG. 9, a method 200 of bowing of a band of image data is flowcharted. A band 112 of data is logically assembled from a plurality of tiles 106. The band 112 is schematically illustrated as a contiguous block for illustration only and may, or may not actually be so stored. A bow profile or instruction list 86 that characterizes the desired process direction pixel shifts is passed to the bow processor 74 via the bow control registers 88A. The bow profile is shown graphically for purposes of illustration. However, the bow profile may be characterized in any practical manner that can be suitably interpreted by the bow processor 74, as set out in greater detail below. The bow processor 74 is also provided with the addresses in the main system memory 76 of the destination buffer 132 and overflow buffer 134 associated with the band 112 to be processed. A mode instruction is also provided that indicates whether the mode of operation is set to simplex or duplex.

The bow processor 74 processes the band 112 of image data according to the characterization of the bow profile, and stores the results in the destination buffer 132. Notably, the image data is graphically illustrated "below" the bow profile line in the destination buffer 132 indicating that the image data has been shifted in the process direction in a manner that generally corresponds to the bow profile. Also, the destination buffer 132 is illustrated as a contiguous block for illustrative purposes only and need not actually be stored as such. As graphically illustrated, it is possible for data to "overflow" beyond the dimensions of the band 112 due to pixel shifting beyond the boundary of the band 112. Under such a circumstance, the data that overflows is captured and placed into the overflow buffer 134. The image data that has overflowed from the destination buffer 132 is graphically illustrated "above" the bow profile line indicating that the image data has carried out of the band 112 currently being processed due to pixel shifting in the process direction. The image data in the destination buffer 132 (for simplex) or the overflow buffer 134 (for duplex) is communicated to the video processor 82 and correspondingly, the printhead 36.

Clear Behind Logic

Referring back to FIG. 8, clear behind logic 136 is optionally provided to selectively erase sections of the second area 122 of the system memory 76 after the contents have been read out to the appropriate cyan, magenta, yellow and black video processor 82C, 82M, 82Y, 82K. For example, a "clear behind" video DMA feature may be implemented. Basically, software is used to configure the clear behind logic 136 so that operations that read from the second area 122 of system memory 76 e.g., video DMA operations, clear the memory contents subsequent to a successful read.

The clear behind feature allows certain efficiencies to be built in to the bow processor 74 and the cyan, magenta, yellow and black video processors 82C, 82M, 82Y, 82K to enhance processing performance. When implementing a clear behind strategy, it may be desirable to implement a DMA approach to achieve a performance advantage because the software itself will not have to clear the data read from the second area 122 of the system memory 76. The clear behind logic is optional and implementation of such will depend upon the particular application.

Pel Synthesis

The bow processor 74 performs process direction adjustments by "jumping", i.e., shifting rows of pixels within a one pixel wide column (process direction). However, a constraint inherent in such an approach limits the resolution of bow correction to the height of a pixel element or one full Pel of correction. Sometimes however, sub-pixel adjustments may be necessary to optimize the accuracy of the correction. Under such a circumstance, Pel Synthesis logic 140 may optionally be used to help mask the distortions in print caused by "jumping" scan lines by providing sub-scan line adjustments. For example, Pel synthesis adjustments may be performed on any Pel across the scan up to the maximum print resolution of the device. By using the Pel synthesis logic 140 in conjunction with the bow processor 74, apparent print resolution can double in some cases. For example, printing at 600 dpi may appear to approximate 1200 dpi resolution. Conceptually, software determines the one bit pixel columns that require a sub-pixel adjustment such that the combination of the full-pixel resolution adjustments performed by the bow processor 74 and the sub-pixel resolution adjustments performed by the Pel Synthesis logic 140 achieve a desired precision of process direction position adjustments. The operation of Pel synthesis is set out in U.S. Pat. No. 6,229,555 to the same assignee, which is hereby incorporated by reference in its entirety herein. Additionally, Pel Synthesis can be used to perform process direction pixel adjustments for half toning as set out in U.S. patent application Ser. No. 10/757,130, entitled "Method And Apparatus For Minimizing Visual Artifacts In Images Generated By An Electrophotographic Machine", to the same assignee, which is hereby incorporated by reference in its entirety herein.

Depending upon the specific implementation, it may be convenient to consolidate several of the components of the controller 12 into a system application specific integrated circuit (ASIC) such as those described components contained within the dashed box 141, however, the invention should not be construed as limited to requiring an ASIC or any specific hardware architecture. Rather, the operations performed by the controller 12 as described herein may be implemented in any combination of hardware and software.

Rules for Process Direction Position Adjustments

Depending upon the particular implementation of the bow processor 74, it may be convenient to establish "rules" that the software must follow when deriving the appropriate bow profiles. The rules constrain the instructions so as to attempt to reduce visual artifacts that may occur as a result of the bowing operations. An exemplary assumption may assert that all profiles are provided in "Left to Right" format as seen on the front side of a simplex page. Another exemplary rule may assert that, as the profile is "walked" one bit wide column by column from left to right according to the above described assumption, the minimum offset is zero. That is, the bow profile is applied such that each pixel that is shifted in the adjusted image data, is shifted into a row that is lower than its original row position. This rule may provide certain computational efficiencies by avoiding certain usages of negative numbers. Thus the profile will reach into the first writing line at least once. Another exemplary rule may ensure that there is no provision for bowing "multibit" data. That is, every Pel is assumed to be autonomous and can be moved up or down a scan line independent of the bits surrounding it.

Visual artifacts may be reduced by limiting the number of consecutive shifts. For example, if a particular bow profile is at a generally intermediate or low process direction resolution (e.g. 1200 dpi or less), it may be convenient to constrain the bow processor 74 so that consecutive jumps (either up or down) cannot occur. However, consecutive shifts may be acceptable where visual artifacts are unobjectionable. For example, if printing at 600×2400 dpi, two consecutive jumps may be acceptable because the scan resolution at 2400 dpi is double that of the 1200 dpi case.

It may also be preferable to constrain the maximum slope of the jumps for a given range, and/or for the overall profile. According to an embodiment of the present invention, rules may limit the bow profile to having a bow amplitude of X jumps or less within a span of Y consecutive one bit wide columns in the profile where X and Y are integers. For example, a tile that is 512×128 pixels may be broken down into eight rows of tile sections 114, wherein each row contains eight tile sections 114, each being 64×16 pixels. Thus a vertical strip comprises 64 pixels in width. Within each vertical strip 115, an exemplary rule may constrain the amplitude of the bow adjustments to a maximum number of jumps, e.g., seven jumps per vertical strip 115. Another exemplary constraint may limit the amplitude of bow shifts for an entire profile (band) to Z jumps, e.g. 127 jumps. That is, the range of pixel shifts cannot exceed more than 127 scan lines in any given band 112. Of course, the selection of X and Z is arbitrary and the values herein are merely illustrative. "Amplitude" of the bow profile is thus defined as the process direction distance in pixels, between the lowest and highest points in a bow profile.

Still further, a constraint may be placed on the maximum size of a bow profile. For a 2400 dpi scan direction resolution and a regular letter sized sheet of paper 8.5 inches (21.6 cm) wide, 20,400 pixels are necessary to print a line. If an image plane is broken down into tiles that are 512 pixels in the scan direction, at least 40 tiles (20480 pixels wide) would be required to span the maximum print width. Accordingly, a constraint may limit the size of a bow profile to 40 tiles. Note that it may be convenient to implement this same constraint when allocating memory for the destination and overflow buffers used to process the bands of image data. Accordingly, the destination and overflow buffers for each color image plane in the second memory area 122 may also be allocated to a size equal to 40 tiles. Also, shifts can occur at intervals greater than one, however large jumps will require additional bits to encode the size of the jump, and may introduce visual artifacts in the print output.

Software Interface

The bow control registers 88A define four registers that interface with the bow processor 74. A first register, the Source Address List Register, is actually used to encode three pieces of information. A single bit is used to trigger the start of a bowing operation. Essentially, setting this bit informs the bow processor 74 that it should begin bowing image data. A second bit of the first register is used to encode whether the printing operation is in duplex or simplex mode. Bits 31:2 define a pointer to a source address list in the third section of the main system memory 76. The source address list encodes the bow profile and is explained in greater detail below.

A second register, the Band Destination Address register, holds a pointer to the destination buffer in the second area 122 of the main system memory 76 which holds the current band after being processed, i.e., bowed, for that color image plane. In Simplex mode and for the front or first image in Duplex mode, the second register will point to the beginning of the destination buffer 132. In Duplex mode for the back or second image only, the second register will point to the end of the first tile of the destination buffer-Z scan lines in the process direction, where Z represents the number of scan lines to be processed in the current operation. For example, with reference back generally to FIGS. 4-7, the bow processor 74 may operate on data a band 112 at a time. A band 112 is made up of a plurality of tiles 106, and each tile 106 is further subdivided into a plurality of tile sections 114. In a previously described example, each tile is composed of 512, one bit wide columns by 128 lines of pixel data, and a tile section is composed of 64 columns by 16 lines of pixel data. Accordingly, in Duplex mode, the second register points to the address that is 16 lines from the end of the first tile. Recall from above, that a rule establishes the assumption that the bow profile is provided left from right. Also, as pointed out above, in Duplex mode, processing occurs generally, from the bottom up. Accordingly, in Duplex, the band is processed such that the bottom most row of tile sections 114 across the band 112 are processed from left to right. Next, the second to last row of tile sections 114 across the band 112 are processed, etc. This allows the software to better control pacing to maintain the proper timing of the CYMK laser signals.

The third register, a Band Address Compare register, holds a pointer to the end of the corresponding destination buffer. Logic uses this address to know when to transition bowed data into the overflow buffer. For example, where the image data is logically broken down into 512×128 tiles, and 40 tiles per band, the third buffer will hold the address of the destination buffer +8 kb.

The fourth register, the band overflow address offset register, holds a value representing the Band Overflow Address Offset, which is the offset between the end of the corresponding destination buffer (i.e. the address of the destination of the buffer +8 kb) and the beginning of the corresponding Overflow buffer.

The Source Address List

Each bow profile defines the adjustments required for every one bit wide column along a corresponding color image plane scan line to implement process direction position adjustments. However, it may be impractical to process an entire scan line in a single operation. Additionally, it may be desirable to encode other operational instructions that are of interest to the bow processor 74. Accordingly, each bow profile may be encoded as a series of instructions, where each instruction contains the bow profile for only a section of the length of the scan line. As noted above, the microprocessor 92 generates, through software, a bow profile for each color image plane. The entries to the source address list are derived by the microprocessor 92 at a convenient time, such as at system start up or prior to the bow processor 74 implementing bow operations on image data.

Each bow profile may be encoded as a series of bow instructions. One convenient way to package the bow instructions is to combine the instructions for several adjacent one bit wide column positions along the scan line into a single entry. The instructions can also be used to encode other control information as well. For example, where the bow processor 74 processes the image data one tile section at a time, each vertical strip 115 must have associated with it, an entry into the source address list. Thus for the above example, if there are 40 tiles per band, and 8 tile sections (and 8 vertical strips 115) that span across each tile, then 320 vertical strip entries are required in the source address list for an entire scan line. As discussed above, the bow processor 74 works across a band 112 a row of tile sections 114 at a time. In this case, every vertical strip entry in the source address list may be accessed once per row of processing. The source address list includes embedded therein, the bow profile and shift instructions for each pixel in the column associated therewith. As noted above, the source address list may optionally include additional instructions to effect processing efficiency such as for bit expansion or to identify that a tile section contains no operational data therein. To allow for such additional processing efficiencies, each entry in the source address list may comprise a relatively large instruction. One exemplary bit definition for a 128-bit entry into the source address list is set out in Table 1 below.

TABLE 1

Source Address List/Vertical Strip Entry Bit Definition

| Bit 0 | Bow Direction | 1 Bow Up; 0 Bow Down |
| Bits 7:4 | Bit expansion | 0000 no expansion |

TABLE 1-continued

Source Address List/Vertical Strip Entry Bit Definition

| | | 0001 2X expansion - expand high half of image data at Source Pointer |
| | | 0101 2X expansion - expand low half of image data at the Source Pointer |
| | | 0010 4X expansion of the most significant 16 bits of Source Pointer |
| | | 0110 4X expansion of 16 bits ending immediately before the start of the 16 most significant bits |
| | | 1010 4X expansion of 16 bits starting immediately after the 16th least significant bit |
| | | 1110 4X expansion of the least significant 16 bits of Source Pointer |
| Bits 24:16 | Offset | Offset in scans of where to read destination data |
| Bit 32 | Last Entry | 1 = this is the last vertical strip of the bow operation |
| | | 0 = more entries to come in the source address list |
| Bit 33 | NOP Data | 1 = Source data for this vertical strip is part of a NOP tile |
| | | 0 = Use the address contained in source pointer |
| Bits 61:35 | Source Pointer | Pointer to 64 bit data word that contains the first source data to be bowed for this vertical strip. Each vertical strip has this one entry to be used for all scans in a given tile. The logic works on 16 scans at a time and this register is set differently based on Simplex/Duplex mode and/or the expansion characteristics of the source data tile. |
| | | Simplex: Pointer to 64 bit data word in scan 0 that contains source data for this vertical strip. |
| | | Duplex: Pointer to 64 bit data word 16 scans from bottom of tile that contains source data for this vertical strip |
| Bit 63 | 65th bit Profile | Look ahead for the first bit of the next vertical strip of the bow profile. If set, indicates a reversal of direction on the last bit of this column i.e. would be the second bit of a 11 instruction. If cleared, no effect. |
| Bits 127:64 | Bow Profile | Bow Profile for each bit of the vertical strip. |
| | | 0 - no bow |
| | | 1 - bow one scan in the current direction |
| | | 11 - reverse current direction and bow |
| | | Left to Right - Cannot bow data more than every other bit |

As noted above, prior to performing a bowing operation, the microprocessor 92 generates a bow profile for each of the color image planes. The microprocessor 92 divides each bow profile into widths (corresponding to the width of a vertical strip 115), which are encoded into the source address list entries. For example, in the above source address list bit definition there are 64 bits (bits 127:64) of a given bow profile encoded into each source address entry. Each bit corresponds to the position of one column of an associated vertical strip 115 and determines whether a pixel shift (jump) should occur at that column. Note from the bow profile definition in Table 1 that in order to designate a change of direction, a sequence of "11" is required. However, the bow profile only stores one bit per column. In order to encode a direction change, the microprocessor 92 takes advantage of two of the rules for processing set out above. Namely, the bow processor 74 processes the bow profile from left to right, and cannot jump on adjacent columns. Thus if the bow processor 74 is to perform a jump on a first column, it cannot perform a jump on the column immediately to the right thereof. As such, the microprocessor 92 programs the bow profile such that a bit in the bow profile just to the right of a valid jump (bit value of 1) encodes whether to maintain the current direction (bit 0=0) or to reverse direction (bit 0=1) as set out in the bow profile definition in Table 1.

There is one exception to the above-described look ahead feature. If the last bit of the currently loaded bow profile is a 1 (bit 64 of the current entry), the bow processor 74 must perform a jump, but would have to load the next source address list entry to determine whether a change in direction is required. To avoid loading two source address list entries for one operation when the last bit of the bow profile (bit 64) for the current entry is 1, the value of bit 127 in the next source address list entry (the first bit of the next bow profile) is designated the 65$^{th}$ bit and may be encoded at bit position 63 in the current source address list entry. For example, if the last bit of the bow profile in the current source address list entry (bit 64) is 1 and the first bit of the bow profile (bit 127) in the next source address list entry is also 1, the microprocessor sets the 65$^{th}$ bit (encoded at bit 63) of the current source address list entry to 1. This allows the bow processor 74 to know that a direction change is required, even when processing the last bit of the bow profile encoded in the current source address list entry. The microprocessor 92 must also toggle the first bit (bit 127) of the next source address list entry to 0. This prevents the bow processor 74 from performing a shift on the first bit (bit 127) when the next source address list entry is loaded. The use of the 65$^{th}$ bit is set out in greater detail below.

For example, assume that the bow processor 74 encounters the series "1110", e.g., bits 67-64 in a source address list entry, and the current direction of bowing as defined by bit 0 of the current source address list entry is up, i.e., bow direction=1 (see definition of bit 0 in Table 1 above). The bow processor 74 encounters the value 1 in the series so it looks ahead to the next value in the series, which is also 1. Accordingly, the bow processor 74 knows from the bow profile rules set out in Table 1, that it must reverse direction, and bow one scan line. Accordingly, the bow direction as described by bit 0 in Table 1 is toggled to 0 and the image data in the column and row corresponding to the first value of the bow profile is bowed down one row. The bow processor 74 also knows from predetermined rules that it cannot shift on consecutive columns, so no additional shift occurs to the image data corresponding to the second value of the bow profile (even though the second value also equals 1). Thus the image data corresponding to the second value shares the same row as the image data corresponding to the first value. Moving on, the third value in the series also has a value of 1 so the bow processor 74 looks ahead to the fourth value, which is equal to 0. As such, because of the rules set out in Table 1, the bow processor 74 knows to perform a shift operation without need to reverse direction. Accordingly, the image data in the column and row corresponding to the third value is shifted down one row. Again, because shifts cannot occur on adjacent columns, no shift can occur at the fourth entry. The process can thus be characterized as D0D0 where each D indicates a shift down one row and 0 indicates no shift. As such, the image data corresponding to the first and second values are shifted down one row and the image data corresponding to the third and fourth values are shifted down two rows from their respective original positions.

As another example, a bow profile series of 10110, e.g., bits 127-123 of a source address list entry with an initial bow of down, i.e. bow direction=0 as described by bit 0 in Table 1, would result in the processor detecting the value 1 in the series and looking ahead. The occurrence of the value of 0 in the series indicates no reversal of direction. Therefore the bow processor 74 shifts the image data in the column and row corresponding to the first value in the series down one row. There is no shift on the second value in the series because there cannot be shifts on consecutive columns. The third value in the series has a value of 1, so the bow processor 74 looks ahead to the fourth value in the series, which also has a value of 1. Accordingly, the bow processor 74 toggles the direction (bit 0 in the source address list entry) to a 1, and the image data in the column and row corresponding to the third value in the series is shifted up one row. Again, the rules prohibit shifts on consecutive columns, so there is no shift corresponding to the fourth value in the series. The fifth value in the series has a value of 0, so there is no shift operation performed with respect thereto. The operation can thus be characterized as D0U00 where D indicates a shift down one row position for an associated column, U indicates a shift up one row position for an associated column, 0 indicates no shift.

The 65$^{th}$ bit (bit position 63) is an extension of the look ahead feature described above. In the case where the last bit of the bow profile in the current entry is set to 1, it allows the bow processor 74 to look to the first bit of the bow profile in the next entry of the 320 entries in the source address list without actually loading that next entry. As noted above, the 65$^{th}$ bit is set to 1 by the microprocessor 92 if the last bit of the bow profile (bit 64) in the current entry is 1 and the first bit of the bow profile (bit 127) in the next entry is 1. Basically, the microprocessor 92 knows that if the last bit of the current entry is 1, designating a shift for that column, then a shift cannot occur in the first column of the next entry. If the last bit of the bow profile in the current entry and the 65$^{th}$ bit are both set, designating a reversal in direction and a shift at the last column of the current entry, then the first bit of the next column of the bow profile data (e.g., bit 127 of the next source address list entry) must be cleared by the microprocessor 92 so that no shift occurs on the first column of the next entry. When the bow processor 74 encounters a 1 at the last bit in the currently loaded bow profile, the 65$^{th}$ bit is checked. If the 65$^{th}$ bit is a 0, then the bow processor performs a jump in the current direction stored in bit 0 of the entry. If the 65$^{th}$ bit is a 1, the bow processor 74 toggles the direction stored in bit 0 and performs a jump in the new direction. This, in essence, emulates the way in which the logic traverses the bow profile and allows the firmware to handle boundary conditions created by breaking the bow profile into vertical strips 115. An example of this is illustrated below with reference to Table 3.

The column shifts may alternatively be coded using other practical means, such as where each column is encoded as a two-bit sequence. However, if two unique bits are allocated per pixel and other processing efficiencies are to be encoded into the entry, then the size of the entry may increase.

Bit 32, the last entry bit describes whether the current tile section being processed is the last tile section. Bits 24:16 of the Source Address List entry indicate an offset that is used to determine where the bow processor 74 is to read data from to begin the read/modify/write operations necessary to bow the image data. As a simple example, assume that a tile within a given band comprises only three tile sections 114, where each tile section is 8 Pels in width. Also assume that the X in the below table graphically defines the desired bow profile.

TABLE 2

Exemplary Bow Profile

| Tile Section 1 | | | | | | | | Tile Section 2 | | | | | | | | Tile Section 3 | | | | | | | |
|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
|   |   | X | X |   |   |   |   |   |   |   |   |   |   |   |   |   |   |   |   |   |   |   |   |
| X | x |   |   | x | x |   |   |   |   |   |   |   |   |   |   |   |   |   |   |   |   |   |   |
|   |   |   |   |   |   | x | x |   |   |   |   |   |   |   |   |   |   |   |   |   |   |   |   |
|   |   |   |   |   |   |   |   | X | X |   |   |   |   |   |   |   |   |   |   |   |   |   |   |
|   |   |   |   |   |   |   |   |   |   | x | x | x |   |   |   | X | X | X | X | X | X | X |   |
|   |   |   |   |   |   |   |   |   |   |   |   |   | x | x |   |   |   |   |   |   |   |   | x |

TABLE 3

Bow Profile and Offset
The bow is represented to the hardware as summarized in the table below.

| Tile Section | Direction | Profile | Offset | Look Ahead Bit |
|---|---|---|---|---|
| 1 | 1 | 00101110 | 0 | 0 |
| 2 | 0 | 10100101 | 3 | 1 |
| 3 | 1 | 0*0000001 | 4 | 1 |

Notably, the offset is set at the highest row in which the bow processor 74 will place image data within the destination buffer 132 to process each tile section 114 corresponding to the associated vertical strips 115. In one illustrative implementation, any given vertical strip 115 comprises 64×128 pixels and the maximum offset may be 127 pixels. With reference to the example in the above tables, for tile section 1, the offset of 0 is denoted by the uppercase, bold X. For tile section 2, the offset is 3, and for tile section 3, the offset is 4. The * after the first 0 in the Profile column corresponding to tile section 3 indicates that the bit position of the bow profile was a 1, but was cleared by the microprocessor 92 due to implementing a look ahead feature (Look Ahead Bit for tile section 2, which is set to 1). This is evidenced by the observation that the direction of the jumps in Table 2 has changed.

The bow processor 74 bow adjusts an entire tile section prior to moving on to the next tile section. When the bow processor 74 has bowed a tile section of image data, it updates pointers appropriately, so it will know where to start when it goes to bow the next tile section. A source pointer field in each Source Address List entry (bits 35 to 61) should contain the address of the source data to be bowed, e.g., the address for the corresponding tile section in the first area 120 of the main system memory 76. Accordingly, these pointers can be written to in a variety of manners, such as to implement simplex and duplex modes. That is, the bow processor 74 can implement either simplex or duplex modes simply by determining the order that the data is bowed and how the pointers are incremented/decremented as the bow processor 74 processes the tile sections of each band.

As an example, assume a simplex mode of operation is to be executed. Also assume that each tile 106 is 512×128 bits and the bow processor 74 processes the tiles in tile sections that are 64 columns×16 rows such that there are eight rows of eight tile sections 114 per tile 106. Thus there are eight vertical strips 115 per tile 106, each containing eight tile sections 114. Note that the source pointer (Bits 61:35) of a given source address list entry corresponds to the address of a given vertical strip 115. Accordingly, up to eight additional source pointers (referred to as source tile section pointers) may be required, one for each tile section 114 of a given vertical strip 115. The eight source tile section pointer entries for the eight vertically aligned tile sections of the vertical tile corresponding to the source pointer (bits 61:35 of the source address list entry) are shown in the below table.

TABLE 4

Source Pointer Entries - Simplex

| Src Pointer | Address | Contents |
|---|---|---|
| 0 | 0x00100000 | Base address for tile |
| 1 | 0x00100008 | Pointer to top of $2^{nd}$ tile section of source data |
| 2 | 0x00100010 | Pointer to top of $3^{rd}$ tile section of source data |
| 3 | 0x00100018 | Pointer to top of $4^{th}$ tile section of source data |
| 4 | 0x00100020 | Pointer to top of $5^{th}$ tile section of source data |
| 5 | 0x00100028 | Pointer to top of $6^{th}$ tile section of source data |
| 6 | 0x00100030 | Pointer to top of $7^{th}$ tile section of source data |
| 7 | 0x00100038 | Pointer to top of $8^{th}$ tile section of source data |

The corresponding duplex case for the example illustrated with respect to Table 4 is shown in table 5 below. Note that the hardware is pointed to data that is 16 scans (number of rows in a tile section 114) above the bottom of the tile 106 and allows the logic to decrement through the tile to perform the bow operation.

TABLE 5

Source Pointer Entries - Duplex

| Src Pointer | Address | Contents |
|---|---|---|
| 0 | 0x00101C00 | Pointer to 16 scans from bottom of data $1^{st}$ tile section |
| 1 | 0x00101C08 | Pointer to 16 scans from bottom of data $2^{nd}$ tile section |
| 2 | 0x00101C10 | Pointer to 16 scans from bottom of data $3^{rd}$ tile section |
| 3 | 0x00101C18 | Pointer to 16 scans from bottom of data $4^{th}$ tile section |
| 4 | 0x00101C20 | Pointer to 16 scans from bottom of data $5^{th}$ tile section |
| 5 | 0x00101C28 | Pointer to 16 scans from bottom of data $6^{th}$ tile section |
| 6 | 0x00101C30 | Pointer to 16 scans from bottom of data $7^{th}$ tile section |
| 7 | 0x00101C38 | Pointer to 16 scans from bottom of data $8^{th}$ tile section |

NOP/Expansion

The various embodiments of the present invention allow certain computational efficiencies to be built into the bow processor 74. For example, if all of the image data in a tile section is "0", i.e., the tile section is blank or a null data block (referred to herein as a "no-op" or "NOP"), there is no need to expend processing power, e.g., DMA accesses. As such, bit 33 (the NOP) bit is set in the source address list to indicate that no processing is necessary. The NOP interface may also be used to address partial tile widths. Essentially, tile sections of data in the last tile of each row of tiles can be configured to be NOPs (independently of whether the entire tile is a NOP tile).

Eight valid addresses are set in a source pointer location of the source address list (bits 61:35). However, these addresses must be set in conjunction with the appropriate bit expansion value (Bits 7:4). Bit expansion essentially reduces the number of DMA transactions that must occur during processing. For example, the controller 12 may convert a 600 dpi image to 1200 dpi resolution for printing (2× expansion), or convert a 300 dpi image to 1200 dpi (4× expansion). The table below shows examples of how to represent one block of source data with 4× expansion in simplex mode. As can be seen in the table below, one source pointer value which points to 64 bits of image data is actually used for 256 bits of source image data in conjunction with the Expansion bits.

TABLE 6

Expansion 4x Simplex

| Src Pointer | Address | Contents |
| --- | --- | --- |
| 0 | 0x00100000 | 0010 4x expansion, most significant 16 bits of image data |
| 1 | 0x00100000 | 0110 4x expansion, next 16 bits of image data |
| 2 | 0x00100000 | 1010 4x expansion, next 16 bits of image data |
| 3 | 0x00100000 | 1110 4x expansion, least significant 16 bits of image data |
| 4 | 0x00100008 | 0010 4x expansion, most significant 16 bits of image data |
| 5 | 0x00100008 | 0110 4x expansion, next 16 bits of image data |
| 6 | 0x00100008 | 1010 4x expansion, next 16 bits of image data |
| 7 | 0x001000008 | 1110 4x expansion, least significant 16 bits of image data |

A source pointer example for 2× expansion in duplex mode is provided in the table below.

TABLE 7

Expansion 2x Duplex

| Src Pointer | Address | Contents |
| --- | --- | --- |
| 0 | 0x00100E00 | 0001 2x expansion, expand high half of image data |
| 1 | 0x00100E00 | 0101 2x expansion, expand low half of image data |
| 2 | 0x00100E08 | 0001 2x expansion, expand high half of image data |
| 3 | 0x00100E08 | 0101 2x expansion, expand low half of image data |
| 4 | 0x0010E10 | 0001 2x expansion, expand high half of image data |
| 5 | 0x0010E10 | 0101 2x expansion, expand low half of image data |
| 6 | 0x0010E18 | 0001 2x expansion, expand high half of image data |
| 7 | 0x00100E18 | 0101 2x expansion, expand low half of image data |

Further, it shall be observed that the bow profile characterizes the corrections for implementing process direction position errors of a laser beam along the entirety of a scan line, which is typically of sufficient length to output at least an 8½ inch (21.6 centimeter) image. However, an image to be printed need not span the entire length of the bow profile. Also, the left-most column of Pels of an image to be printed need not correspond to the first entry in the bow profile. For example, a margin adjustment may shift an image to be printed in the scan direction. Accordingly, before performing process direction position pixel shifts, the image data is aligned or associated with the appropriate subset of the bow profile based upon the left margin setting for the image data.

Initiating a Bow Operation

There are a number of approaches that can be implemented to effect communication and timing between the bow processor 74 and the remainder of the system. For example, software may create the entries in the source address list and initialize the bow correction registers 88A during a warm-up or other initialization period. A bit may then be set in the Source Address List Register, e.g., bit 0, to tell the bow processor 74 to start performing the bow operation. Completion of a bow operation may be correspondingly indicated by clearing the select bit in the Source Address List Register. Alternatively, an interrupt scheme may be implemented.

Bow Pacing Algorithm

Software is also used to control the pacing of the bow processor 74 with respect to the cyan, magenta, yellow and black image plane video processors 82C, 82M, 82Y, 82K. As described with respect to FIGS. 8 and 9, the bow processor 74 conceptually performs bow operations by performing vertical pixel jumps and storing the results in the destination buffer 132 or the overflow buffer 134 for each color plane. However, it may be advantageous to add a third buffer for purposes of bow pacing, to avoid conflicts between the cyan, magenta, yellow and black image plane video processors 82C, 82M, 82Y, 82K attempting to extract image data for their corresponding image plane, and the bow processor 74 attempting to write to the corresponding destination or overflow buffer 132, 134.

In practice, the second memory area 122 described with reference to FIG. 8 may actually be logically partitioned so as to hold three buffers, each the size of a band, for each color plane. Thus for a four color image plane device, twelve buffers are reserved within the second memory area 122. As bands are submitted through the system 70, if the bow processor 74 is not in use, the band is submitted for bow correction immediately. If the bow processor 74 is currently in use (working on a previously submitted band), the band is placed in a queue 142 for bowing later. A queue searching algorithm in the code is then run whenever a bow operation is completed or whenever a video DMA is completed, e.g., one of the cyan, magenta, yellow and black video processor units 82C, 82M, 82Y, 82K reads data from the second area 122 of the system memory 76. At those points in time, the queuing software must search the queue of submitted bands to see which band should be bowed next. Numerous schemes may be implemented to read from the queue. However, one approach that enables efficient pacing is to select the next band from the queue where two of the three pre-allocated buffers must be available for that band's particular plane. A band is available if it is not currently being used by the video unit. Also, the band must be the "oldest" band for that plane in the queue.

Figure 10:
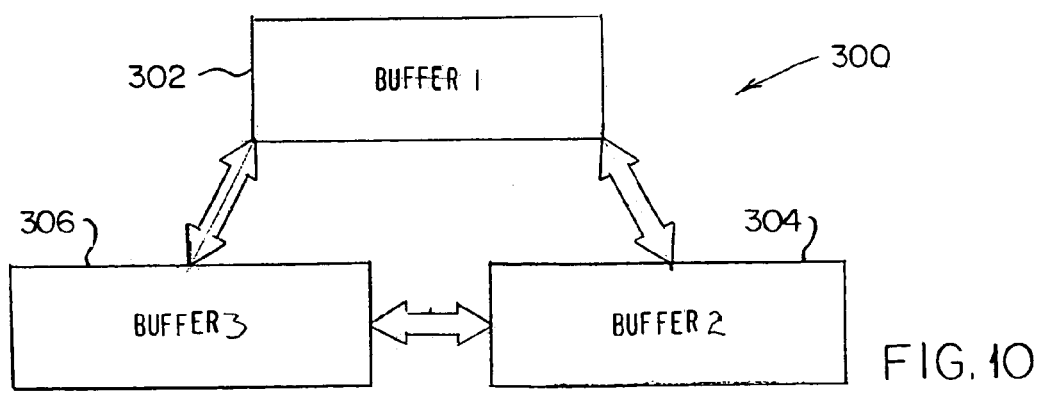
FIG. 10 is a schematic illustration of the use of buffers for circularly performing destination, overflow and output functions.

The use of three buffers per image plane is clarified with reference to FIG. 10. Referring thereto, a method 300 for bowing image data uses first, second and third buffers 302, 304, 306. Only one image plane is illustrated for simplicity. However, the method applies equally to each color image plane. During a given operation, each buffer could serve as the destination, overflow, or output buffer for a bowing operation. For example, assume that for an initial operation, tiles of image data from the first area 120 of the main system memory of FIG. 8 are organized, after a bowing operation, into a first band and placed into the first buffer 302. The first buffer 302 is now conceptually, the destination buffer. As the image data is bowed, there may be overflow. The overflowed data is captured and temporarily stored in the second buffer 304, which now conceptually serves the role as the overflow buffer. The third buffer 306 is not used.

When the bow processor 74 processes the next band for that given image plane, the bow adjusted data is stored in the second buffer 304, which also includes the overflow data from processing the previous band. Thus the second buffer 304 is now conceptually, the destination buffer. Overflow of the current band is captured and temporarily stored in the third buffer 306, which is now conceptually the overflow buffer. The first buffer 302 contains the previous bow adjusted data, and is made available to the corresponding color image plane video processor for imaging. Notably, it can be seen that the bow processor and the video processor are working from different buffers during a given operation. The above-described process repeats in a circular fashion so that each of the first, second and third buffers 302, 304, 306 take turns serving as the destination, overflow and print buffers.

The method 300 sets up a "race condition" by which the bowing of the next band must be complete for a particular color image plane in the same amount of time that it takes a corresponding one of the cyan, magenta, yellow and black video image processors to read the necessary information e.g., via a video DMA. If this "race condition" is not consistently maintained for a given application, the system 70 may pre-allocate more than three bands per color image plane and operate them in a circular manner analogous to that described above.

Figure 11:
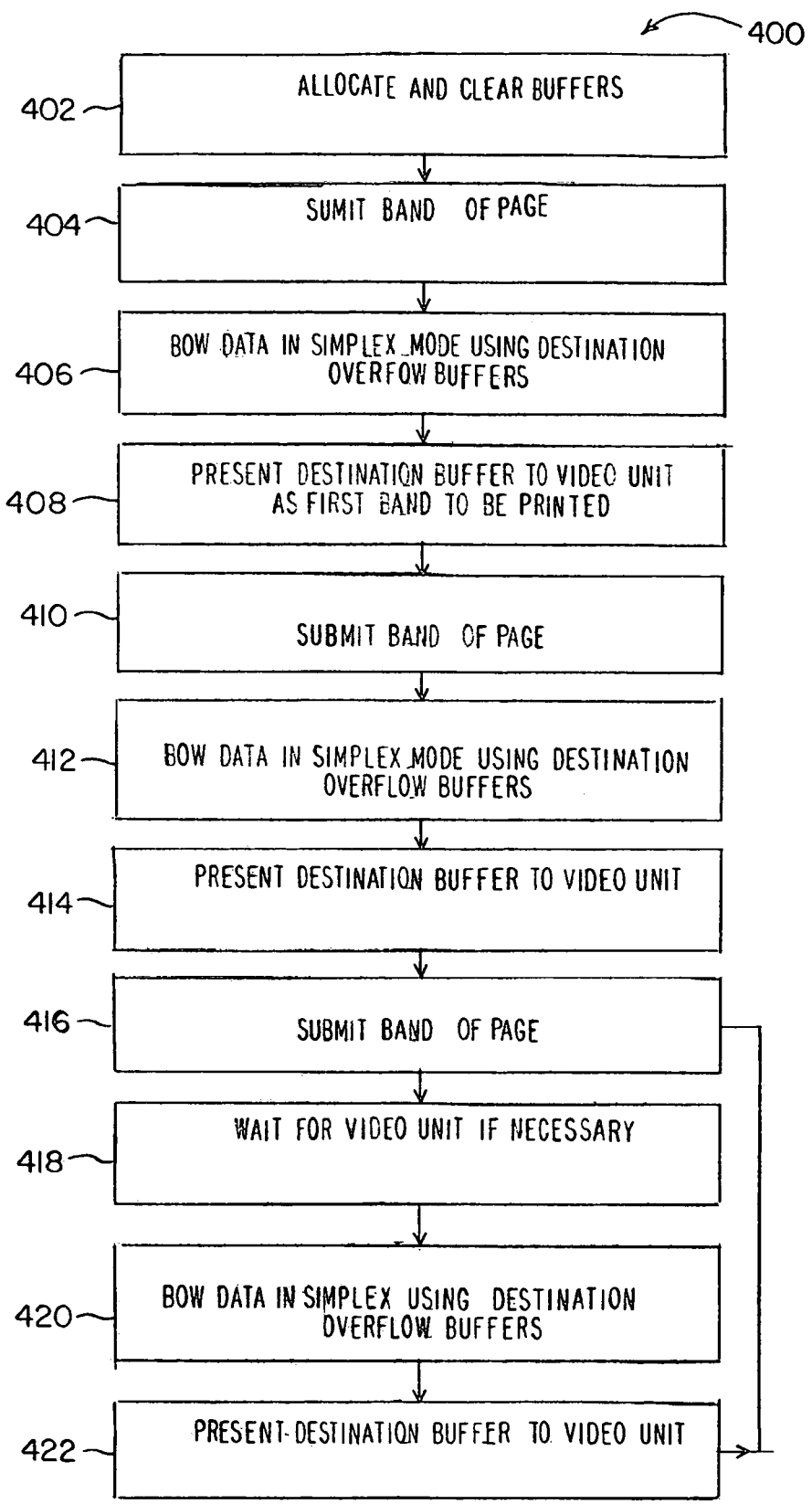
FIG. 11 is a flow chart illustrating a method for correcting laser beam process direction errors in a simplex printing operation according to an embodiment of the present invention.

The approach described with reference to FIG. 11 provides a generalized approach to using circular buffering for providing destination, overflow and output of information. However, in practice, the method 300 may need to be slightly modified depending upon whether the image is being printed in simplex (top to bottom) or duplex (bottom to top).

Simplex Mode

Referring to FIG. 11, a method 400 of bow adjusting image data is illustrated. Initially, three buffers, e.g., first, second and third buffers described with reference to FIG. 10, per image plane, are allocated and cleared at 402. This may be handled by bios operation(s) including DMA transactions, a clear behind processor etc. The first buffer is designated the destination buffer, and the second buffer is designated the overflow buffer. The first band is then submitted to the bow processor at 404. The image data is bow adjusted using a simplex mode operation, and the results are stored in the destination buffer (first buffer) with overflow image data being placed into the overflow buffer (second buffer) at 406. The image data in the destination buffer (first buffer) is made available to the video processor for the corresponding image plane at 408. The next band is submitted to the bow processor at 410. Now, the buffer pointers are updated such that the first buffer will serve as the output buffer for the appropriate video unit. The second buffer (previously, the overflow buffer) will now become the destination buffer and the third buffer will become the overflow buffer. The current band of data is bowed and stored in the new destination buffer (second buffer) with the data overflow being placed into the new overflow buffer (third buffer) at 412. The current destination buffer (second buffer) is made available to the corresponding video processor at 414.

The next band is then submitted for processing by the bow processor at 416. The bow processor waits if necessary for the video processor to complete processing from the output buffer (first buffer) at 418. Upon completion of transactions between the first buffer and the video processor, the bow processor updates the destination, overflow and output buffers once again. That is, the third buffer (previously the overflow buffer) will now serve as the destination buffer. The first buffer (previously the output buffer) will serve as the overflow buffer and the second buffer (previously the destination buffer) will serve as the output buffer. The next band of image data is bow adjusted such that the results thereof are stored in the destination buffer (third buffer) and the overflow is carried into the overflow buffer (first buffer) at 420. The current destination buffer (third buffer) is output for use by the video unit at 422, and flow continues looping back to 416. Notably, the bow processor is nondestructive to the data in the destination buffer and destructive to the overflow buffer when in simplex mode.

Figure 12:
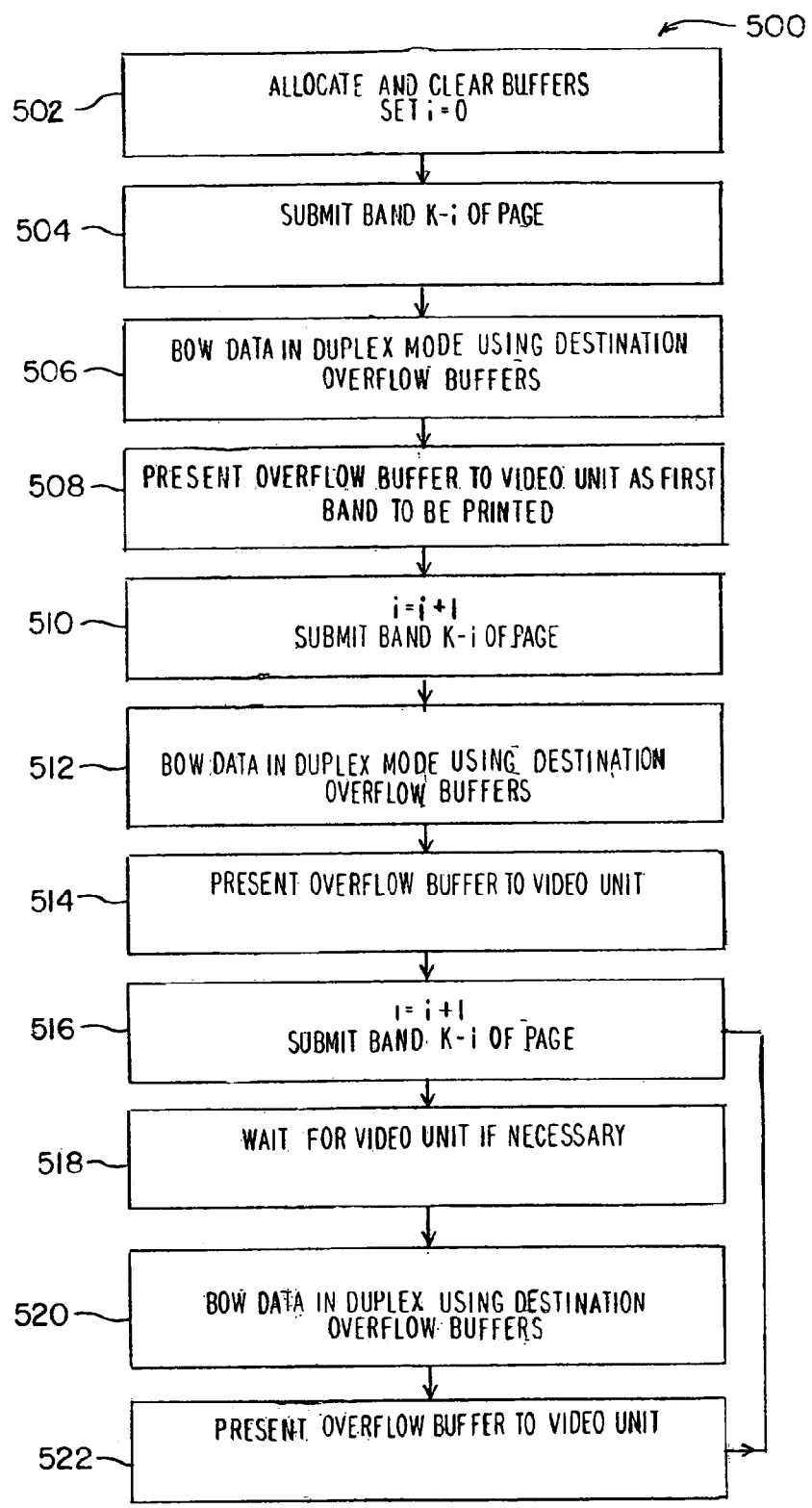
FIG. 12 is a flow chart illustrating a method of correcting laser beam process direction errors in a duplex printing operation according to an embodiment of the present invention.

Referring to FIG. 12, a method 500 for duplex printing is set out. (When printing a page using a duplex mode of operation, the first side of the page is printed out in simplex mode, and the second page is printed out in duplex mode). The application of the bow processor to duplex mode is very similar to that of the simplex mode except for the order in which the three buffers are used when traversing through the image. In duplex mode, bands are submitted to the bow processor in reverse order (i.e. starting with the last band of the image). Initially, three buffers are allocated and cleared for each color plane at 502. A first buffer is set to be the destination buffer, and a second buffer is set to the overflow buffer. Assume that an image to be printed comprises v bands of image data. Also, set i equal to 0. V and i are conceptual variables used to keep track of the current band for purposes of the discussion herein. The system submits band v-i (in this case, the last band of the image) to the bow logic at 504. The band of image data is bowed with the results being stored in the destination buffer and overflow stored in the overflow buffer at 506. The overflow buffer is then made available to the corresponding video unit for imaging at 508. The band counter i is incremented, and band v-i is submitted to the video unit for bow adjustment processing at 510.

Now, the buffer pointers are updated such that the third buffer will serve as the destination buffer, the second buffer will serve as the output buffer, and the first buffer will serve as the overflow buffer. The current band is bow adjusted in duplex mode using the new destination buffer (third buffer) and the new overflow buffer (first buffer) at 512. Notably, the circular direction of assignments of the destination, overflow and output buffers is opposite that of the simplex case. The overflow buffer (now the first buffer) is presented to the corresponding video unit at 514.

The band index i is incremented and band v-i is submitted to the bow processor at 516. As can be seen, the duplex case works from the bottom of the page to the top, going from the last band working towards the first. The bow processor waits if necessary, for the video processor to complete processing from the output buffer (second buffer) at 518. The buffer pointers are updated and data is bowed in duplex mode using the destination and overflow buffers at 520. That is, the second buffer will serve as the destination buffer, the third buffer will serve as the overflow buffer, and the first buffer will serve as the output buffer. The overflow buffer is presented to the video unit at 522 and the control loops back to 516 until the page is complete. Note that the bow logic is nondestructive to the data in the overflow buffer and destructive to the destination buffer when in duplex mode.

Having described the invention in detail and by reference to preferred embodiments thereof, it will be apparent that modifications and variations are possible without departing from the scope of the invention defined in the appended claims.

What is claimed is:

1. A method of electronically adjusting an image to compensate for laser beam process direction position errors in an electrophotographic apparatus comprising:
   reading image data from a first memory location, said image data comprising pixels arranged in a plurality of columns and a plurality of rows;
   performing pixel shifts on select columns of said image data based upon a bow profile that characterizes process direction position errors of Pels written by a laser beam as it traverses generally in a scan direction to define adjusted image data, wherein said bow profile comprises an instruction for each column of said image data indicating whether that column should be shifted up, down, or not shifted with respect to an adjacent column position;
   storing said adjusted image data to a second memory location; and
   deriving a laser signal from said adjusted image data in said second memory location such that said laser signal corresponds to said pixel shifted version of said image data that is pre-warped in said process direction in a manner corresponding to said bow profile.

2. The method according to claim 1, wherein said first and said second memory locations comprise first and second areas of a main system memory.

3. The method according to claim 1, wherein said second memory location stores said adjusted image data for less than the entirety of said image.

4. The method according to claim 1, further comprising:
   organizing said image data into a plurality of bands, each band comprising a predetermined number of columns and a predetermined number of rows of pixels of said image data, wherein each band is further organized into a plurality of sections where each section has a predetermined number of columns less than the entirety of columns of its corresponding band and pixel shifts are performed on select columns of each band based upon said bow profile by processing each band one section at a time, wherein said plurality of bands are processed one band at a time.

5. The method according to claim 4, wherein said second memory location is dimensioned to store at least two bands of adjusted image data.

6. The method according to claim 5, wherein a first band of adjusted image data is processed from said second memory location for deriving said laser signal while pixel shifts are performed on said image data according to said bow profile such that a second band of adjusted image data is stored in said second memory location.

7. The method according to claim 6, wherein processing of said first band of adjusted image data to derive said laser signal must be complete before storing a third band of adjusted image data into said second memory location.

8. The method according to claim 4, wherein said second memory location comprises a destination buffer and an overflow buffer, wherein performing pixel shifts comprises:
   performing pixel shifts according to said bow profile on a select band;
   storing the results in said destination buffer; and
   storing pixels that were shifted out of said select band into said overflow buffer.

9. The method according to claim 8, further comprising an output buffer that contains the contents of a select one of said destination and overflow buffers after processing a previous band, wherein said laser signal is derived from said output buffer.

10. The method according to claim 9, wherein as each band is processed, the previous band from said destination buffer becomes the new data for said output buffer and the data in said overflow buffer is incorporated into the next destination buffer.

11. The method according to claim 9, wherein as each band is processed, the previous band from the overflow buffer becomes the new data for said output buffer and the previous output of said destination buffer becomes the new data for said overflow buffer.

12. The method according to claim 9, wherein said destination, overflow and output buffers are each identified by a pointer to a unique area of said second memory location and as each new band of image data is processed, said pointers circularly rotate so that each buffer serves as the destination, overflow and output buffer for every third band that is processed.

13. The method according to claim 1, further comprising constraining said instructions according to rules that limit the number of process direction shifts that can be corrected.

14. The method according to claim 1, wherein each column includes a one-bit instruction that describes whether the bow processor should perform a relative pixel shift.

15. The method according to claim 14, wherein said instructions are constrained to limit the maximum amplitude of pixel shifts allowable in said bow profile.

16. The method according to claim 1, wherein said pixel shifts are performed from the top to the bottom of said image.

17. The method according to claim 1, wherein said pixel shifts are performed from the bottom to the top of said image.

18. The method according to claim 1, further comprising:
   defining said bow profile to have a plurality of adjacent column positions;
   encoding into each column position, a value that indicates whether a process direction shift should occur in said image data; and
   for each column position where a process direction shift is to occur, encoding a value that indicates a shift direction in the next adjacent column location.

19. The method according to claim 18, wherein each shift comprises a jump of one row of image data in the process direction relative to an adjacent column position.

20. The method according to claim 18, wherein each column position is associated with a predetermined location along a corresponding laser beam scan path and is represented by a one-bit value.

21. The method according to claim 20, wherein shifts are encoded by identifying whether a change in direction should occur relative to a previously determined direction.

22. The method according to claim 18, further comprising applying process direction position shifts to said image data comprising:
   identifying a corresponding column in said bow profile for each print element of said image data being considered; and if said corresponding column indicates a shift:
: reading the next adjacent column in said bow profile;
: determining a direction for said shift based upon a value stored in the next adjacent column; and
: performing a process direction shift of at least one print element of said image data in the determined direction; and if said corresponding column indicates no shift:
: positioning a corresponding print element of said image data in the same row as the most previously placed print element of said image data.

23. The method according to claim 18, wherein said bow profile is encoded part of an instruction.

24. The method according to claim 23, wherein each instruction further encodes a current shift direction.

25. The method according to claim 18, further comprising dividing said bow profile into a plurality of strips wherein each strip encoded into a unique instruction.

26. The method according to claim 25, further comprising encoding a look ahead into each instruction comprising:
: if the last column position of a bow profile strip in a first instruction indicates a process direction shift:
: encoding a look ahead bit in the corresponding instruction with a value corresponding to the direction of the shift; and
: clearing the value of the first column of the corresponding bow profile strip in the next instruction.

27. A system for electronically adjusting image data to compensate for laser beam process direction position errors in an electrophotographic device comprising:
: a main memory location for storing image data;
: a first memory location for storing first adjusted image data;
: a second memory location for storing second adjusted image data;
: a first laser beam operable to sweep across a first scan path to write print elements that are associated with a first color image plane of said image data, said first laser beam exhibiting first process direction position errors;
: a second laser beam operable to sweep across a second scan path to write print elements that are associated with a second color image plane of said image data, said second laser beam exhibiting second process direction position errors; and
: a bow processor operatively configured to selectively obtain said image data from said main memory location, apply pixels shifts on select columns of said image data and store said adjusted image data wherein:
: said bow processor applies pixels shifts on columns of the selected image data based upon a first bow profile that characterizes said first process direction position errors of Pels written by said first laser beam when processing image data associated with said first color image plane to define first adjusted image that is pre-warped in the process direction in a manner corresponding to said first bow profile, said first adjusted image data stored in said first memory location;
: said bow processor applies pixels shifts on columns of the selected image data based upon a second bow profile that characterizes said second process direction position errors of Pels written by said second laser beam when processing image data associated with said second color image plane to define second adjusted image data that is pre-warped in the process direction in a manner corresponding to said second bow profile, said second adjusted image data stored in a second memory location;
: a first laser signal modulates said first laser beam based upon said first adjusted image data; and
: a second laser signal modulates said second laser beam based upon said second adjusted image data.

28. The system according to claim 27, wherein said image data is transferred to said bow processor, said bow processor writes said first adjusted image data to said first memory location and said bow processor writes said second adjusted image data to said second memory location using direct memory access transactions.

29. The system according to claim 27, further comprising a third memory location, wherein said first and second bow profiles are stored in said third location as a plurality of instructions that describe the process direction shifts for corresponding Pel positions along their associated scan paths required to compensate for said laser beam process direction position errors.

30. The system according to claim 27, wherein said bow processor is implemented in an application specific integrated circuit.

31. The system according to claim 27, further comprising a queue accessible by said bow processor for temporarily storing and prioritizing sections of said image data prior to said bow processor applying said pixel shifts to said image data.

32. The system according to claim 27, wherein said electrophotographic device comprises a color device, and said bow processor performs pixel shifts for each of the cyan, yellow, magenta and black image planes.

33. The system according to claim 27, wherein each of said first and second memory locations includes a destination buffer, an overflow buffer and an output buffer, and wherein said system further comprising at least one control buffer in data communication with said bow processor that points to the location in said first memory location of said destination, overflow and output buffers, and at least one control buffer in data communication with said bow processor that points to the location in said second memory location of said destination, overflow and output buffers.

34. The system according to claim 27, further comprising a microprocessor operatively configured to derive said first and second bow profiles based upon data stored on a corresponding printhead.

35. A method for electronically altering image data to compensate for laser beam process direction position errors in an electrophotographic device comprising:
: storing said image data to be printed in memory;
: dividing said image data up into a plurality of sections; and
: for each of said plurality of sections of said image data:
: selectively performing process direction shifts of image data in said section according to a bow profile that characterizes process direction position errors of Pels written by a laser beam as it traverses generally in a scan direction, to define adjusted image data for that section of said image data;
: storing said adjusted image data in a destination buffer;
: capturing adjusted image data shifted out of said section in an overflow buffer; and
: outputting said adjusted image data to a printhead.

36. The method according to claim 35, wherein:
: dividing said image data up into a plurality of sections comprises organizing said image data into a plurality of bands, each band comprising a predetermined number of columns and a predetermined number of rows of pixels of said image data, wherein each band is further organized into a plurality of said sections where each section has a predetermined number of columns less than the entirety of columns of its corresponding band, wherein pixel shifts are performed on select columns of each band based upon said bow profile by processing each band one section at a time and said plurality of bands are processed one band at a time, further comprising:

an output buffer that contains the contents of a select one of said destination and overflow buffers after processing a previous band, wherein said laser signal is derived from said output buffer.

37. The method according to claim 36, wherein as each band is processed, the previous band from said destination buffer becomes the new data for said output buffer and the data in said overflow buffer is incorporated into the next destination buffer or the previous band from the overflow buffer becomes the new data for said output buffer and the previous output of said destination buffer becomes the new data for said overflow buffer.

38. The method according to claim 37, wherein said destination, overflow and output buffers are each identified by a pointer to a unique area of said second memory location and as each new band of image data is processed, said pointers circularly rotate so that each buffer serves as the destination, overflow and output buffer for every third band that is processed.

* * * * *